US00RE41347E

(19) United States
(12) Reissued Patent
Tsutsui et al.

(10) Patent Number: US RE41,347 E
(45) Date of Reissued Patent: May 25, 2010

(54) JOINING METHOD AND APPARATUS OF SINGLE VENEER PIECE

(75) Inventors: Mikio Tsutsui, Aichi (JP); Takayuki Yamauchi, Aichi (JP); Hideki Hasegawa, Aichi (JP); Sekiji Takahashi, Aichi (JP)

(73) Assignee: Meinan Machinery Works, Inc., Obu-Shi (JP)

(21) Appl. No.: 12/155,565

(22) Filed: Jun. 5, 2008

Related U.S. Patent Documents

Reissue of:
(64) Patent No.: 7,097,732
Issued: Aug. 29, 2006
Appl. No.: 10/319,576
Filed: Dec. 16, 2002

(30) Foreign Application Priority Data

| | | |
|---|---|---|
| Dec. 17, 2001 | (JP) | 2001-382526 |
| Jan. 28, 2002 | (JP) | 2002-018249 |
| Feb. 1, 2002 | (JP) | 2002-025288 |
| Jun. 13, 2002 | (JP) | 2002-172664 |

(51) Int. Cl.
*B27D 1/10* (2006.01)
*B27D 3/04* (2006.01)
*B27G 11/00* (2006.01)

(52) U.S. Cl. ..... 156/304.1; 156/546; 156/556; 156/578; 144/91; 144/346; 144/352

(58) Field of Classification Search ..... 156/64, 156/304.1, 304.5, 304.6, 350–352, 356, 358, 156/361, 391, 546, 556, 558; 144/91, 346, 144/348, 352
See application file for complete search history.

(56) References Cited

U.S. PATENT DOCUMENTS

| | | | | |
|---|---|---|---|---|
| 3,461,932 | A | 8/1969 | Shelton et al. | 144/348 |
| 3,565,236 | A | 2/1971 | Southworth et al. | 198/460.1 |
| 3,963,555 | A | 6/1976 | Zweig | 156/358 |
| 4,042,440 | A | 8/1977 | Hasegawa et al. | 156/304.1 |
| 4,931,113 | A | 6/1990 | Feichtmeir et al. | 156/64 |
| 5,235,518 | A | 8/1993 | Maekawa et al. | 144/356 |
| 6,089,297 | A | 7/2000 | Shibagaki et al. | 155/558 |

FOREIGN PATENT DOCUMENTS

| | | |
|---|---|---|
| JP | 41-1588 | 2/1966 |

(Continued)

OTHER PUBLICATIONS

Patent of Abstracts of Japan, vol. 017, No. 151, Mar. 25, 1993 & JP 04–320803 A (Hashimoto Denki Co., Ltd.), Nov. 11, 1992 *abstract*.

*Primary Examiner*—Mark A Osele
(74) *Attorney, Agent, or Firm*—Kratz, Quintos & Hanson, LLP

(57) ABSTRACT

This invention provides joining methods of single veneer piece and a joining apparatus, which can produce more efficient, and effective joining process than the conventional method and apparatus produce. In the process of carrying a single veneer piece (T) in the orthogonal direction against the joining edge (Te) on the conveyor, the joining edges of the preceding and succeeding single veneer pieces come close together, the adhesive material (Sd) is supplied to the clearance between the joining edges, and then the adhesion enhancing action is supplied to the said adhesive material (Sd) to join each single veneer piece (T) successively. The adhesion enhancing action can be applied within the adhesion enhancing section as indicated by lines (Z1) and (Z2), provided on the farther side from the edge approaching position (U) via an adhesion enhancing component (6) to move back and forth at any time while the single veneer piece (T) is being carried or such a motion is halted. And such adhesive enhancing action is applied first to the adhesive material (Sd) which has been supplied for adhering the joining edge positioned on the farthest side in a carrying direction all the time.

7 Claims, 21 Drawing Sheets

FOREIGN PATENT DOCUMENTS

| | | |
|---|---|---|
| JP | 46-40560 | 11/1971 |
| JP | 50-11143 | 4/1975 |
| JP | 50-128371 | 10/1975 |
| JP | 51-057805 | 5/1976 |
| JP | 53-1327 | 1/1978 |
| JP | 55-40401 | 10/1980 |
| JP | 4-320803 | 11/1992 |
| JP | 2887621 | 2/1999 |

JOINING METHOD AND APPARATUS OF SINGLE VENEER PIECE

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to a joining method of veneer sheets (hereinafter referred to as "veneers") and joining equipment.

2. Description of the Related Art

In the conventional way to efficiently join plural short veneers without a sufficient length to be processed, on the way to carry each veneer in a perpendicular direction to the joining edges of each veneer, it is preferable to make edges of a preceding veneer and a succeeding veneer closer such that an appropriate amount of the adhesive material is supplied between the joining edges of the preceding and succeeding veneers or on one portion of one or the other side of the preceding and succeeding veneers at an appropriate time before or after the joining edges come closer. As the said adhesive materials, adhesive thread, adhesive tape or the like in which the desired adhesive materials are coated or soaked in an appropriate base material such as a string material like thread, fiber or the like, or paper tape or the like as well as other well-known materials such as thermosetting adhesive, thermoplastic adhesive or the like which are widely used.

As shown in FIG. 18 for applying the adhesive materials, if a thin type of adhesive material (an adhesive tape with holes (Sa) is used in FIG. 18) is successively applied on the top sides or the bottom sides of the veneers (T) in parallel to the carrying direction (f), this system has an advantage that for example, crack (W), over heated portion (not described in the drawings) or the like which may be involved in the veneers can be also strongly amended and joined. However, such a system has a disadvantage which is a major issue, i.e. the strength of the joining edge (Te) is not sufficient in spite of the high cost for the comparatively large amount of adhesive materials to be used. On the other hand FIG. 21 shows that if the adhesive material (adhesive tape (Sb), adhesive thread (Sc) and adhesive material (Sd) are used respectively in FIGS. 19, 20, and 21) is applied to the joining edges (Te) between the preceding veneer and succeeding veneer, or applied intensively to a small area (therein the joining edge (Te) is centrally located) including the joining edge (Te) on the top side of each veneer, shown in FIGS. 19 and 20, such a system has an advantage in which a comparatively small amount of the adhesive material enables the joining edge (Te) to be strongly joined. Therefore, it is preferable to choose one of the above joining systems of the above systems considering the feature of the single piece, cost performance, and a combination of the above system is practically utilized according to the necessity. In this connection, the reason why the adhesive material is applied to the limited small area is to cut down costs and avoid or reduce the unfavorable influence on joining process for the plywood production from the processed veneers in a certain degree while the practical strength can be obtained without actual hindrance. Although a certain clearance between the joining edges is indicated in FIG. 21 expediently to define the adhesive material (Sd), this clearance is actually unnecessary.

On the other hand, to complete the stable joining procedure quickly, it is important to apply the adhesive action immediately to the adhesive material to activate and enhance the adhesiveness. For example, pressuring action, or pressuring and heating action is provided to the adhesive materials such as pressure-sensitive adhesive material or rewet adhesive material, or heating action or pressurizing and heating action is provided to the adhesive material such as the thermosetting adhesive material, furthermore cooling action, or pressuring and cooling action is provided to the thermoplastic adhesive material respectively.

In the conventional way for applying the adhesive material between the joining edges of the preceding and succeeding veneers or applying intensively to the limited small area on the top or the back side of each veneer including the joining edges, it is possible to supply the adhesive material to the veneers accordingly while being carried on the conveyor. However, the adhesive action is usually enhanced, barring one exception where the adhesive material in which thermoplastic adhesive material is used, the adhesive enhancement is not necessarily used; while natural cooling is provided, which may not be able to carry out a proper cooling function at high temperatures, and joined single pieces can be bonded up and down, which makes it difficult to handle for example, shown in FIG. 17, by providing a joining operation position (Y) on the way of the veneer carrying conveyer, providing appropriate adhesive enhancing device (6) comprising adhesive enhancing function to at least one side of the top surface and the bottom surface of the single piece (the said joining operation position is provided on both sides in the embodiment shown in FIG. 17). Furthermore the said adhesive enhancing device (6) is provided in contact with or with a variable distance to the single pieces (T1) to (T7), and after stopping once, each joining edge (Te) between veneers at the joining operation position, work the adhesive enhancing device (6) to complete supplying adhesive enhancing action to the adhesive material (not indicated in the drawing) only in the sufficient period to activate the adhesive function, then each single piece is again carried.

SUMMARY OF THE INVENTION

In the aforementioned system, however, usually while the adhesion enhancing device is supplying the adhesion enhancing action to the adhesive material, normally the system processing efficiency goes down since the operation of the veneer carrying is halted. Also, in the aforementioned system, a major issue i.e. the immediate result of the adhesive agent is too much emphasized, and adhesive strength, joining cost or the like is sometimes neglected, thus favorable and effective adhesive agent is not always used.

And also in order to resolve such disadvantage and drawback in the conventional invention, the prior invention entitled "MOVING ADHESION METHOD OF SCARF INCLINED SURFACE IN VENEER END JOINT MACHINE" (Japanese patent publication number: 04-320803) provides a moving adhesion method of scarf inclined surface in veneer end joint machine comprising a feature that on the way to carry vertically (in the fibrous direction) the preceding and succeeding horizontally peeled veneer which had been processed such that the both joining edges are slantingly and symmetrically scarfed in a certain cutting pitch, thermoplastic or thermosetting adhesive agent is automatically applied to one of the said inclined scarf surfaces, and each said scarf inclined surface of the preceding and succeeding horizontally peeled veneer is jointed into a unit piece, then carried and applied in a cutting pitch of the said inclined scarf surface while cooling pressure or heating pressure is applied from top and bottom sides of the said unit piece. Thus, in the above moving and applying method which enables the unit piece to be carried forward in a regular cutting pitch while the cooling or heating pressure is applied to the jointed scarf slant face from the top and bottom direction, the time required for applying can be shortened only during the cooling or heating pressuring on the way of carrying, and it is possible to stop applying and setting on the way of carrying the joining veneers. Therefore, compared to the aforementioned conventional system, the said system comprises more effective processing technology to improve the productivity and offer more various choice of the adhesive agent.

However, the aforementioned invention provides very limited technology to processes only veneers which had been cut both cutting faces of the pieces into the scarf inclined surfaces symmetrically with a regular cutting pitch. For instance, this processing system lacks versatility which allows to be applied to the horizontally peeling process for small and narrow veneers with irregular widths in a fibrous direction and orthogonal direction. Furthermore, in the said invention, joining process of the scarf inclined surfaces in the joining position and cooling and heating process for the joined scarf inclined surfaces from the top and bottom sides must be correlated, which means that it is impossible to execute one process for plural time while the other process is being executed for one time, in other words, improvement for the processing efficiency is not greatly expected. Therefore, it was not a sufficient invention to greatly rationalize the process efficiency for joining single pieces.

This invention is designed to solve the disadvantage, drawback, defect or the like as disclosed in the conventional system or above paragraphs, and provides a joining method (claim 1) as a feature of joining single piece successively in which, firstly, on the way to carry a single piece on the conveyor in an orthogonal direction against the joining edge of the single piece, wherein a joining edge of the preceding piece and a joining edge of the succeeding veneer come closer, accordingly an adhesive material is intensively supplied to one portion of the edge of the preceding veneer or the edge of the succeeding veneer or to at least one portion within a small limited area on the top or bottom face of each veneer including the joining edges inside, the adhesion enhancing action is supplied to the said adhesive material, therein at least the aforementioned adhesion enhancing action can be supplied at any time while the veneer is being carried or such a motion is halted within a certain length adhesion enhancing section provided on a farther side from the edge approaching position in a carrying direction of the single piece carrying route, and the adhesion enhancing action is applied to the farthest joining edge of the unjoined veneers which comes first to the aforementioned adhesion enhancing section in a carrying direction.

Also, as a joining apparatus used for executing the aforementioned joining method, this invention provides a joining apparatus (claim 2) comprising a veneer carrying system to establish a carrying route which enables a joining edge of the succeeding veneer comes close to a joining edge of the preceding veneer, an adhesive material supplying system to supply an appropriate amount of the adhesive material intensively to a portion between the joining edges of the preceding and succeeding veneers or to at least one portion in a small limited area on the top or bottom face of each veneer including the joining edges inside, together with an adhesion enhancing system comprising an adhesion enhancing component to supply the adhesion enhancing action to the adhesive material, wherein at least the adhesion enhancing system comprising the aforementioned adhesion enhancing component is provided to move back and forth within a certain length adhesion enhancing section provided on the farther side from the edge approaching position in a carrying direction of the aforementioned carrying route, comprising a control system to move the said adhesion enhancing system to the position of the unjoined edge which is the farthest from the edge approaching position in the carrying direction for processing each joining edge which successively comes into the said adhesion enhancing section, and to activate the adhesion enhancing component to supply the adhesion enhancing action to the adhesive material at any time while the veneer is being carried or such a motion is halted.

This invention provides a joining apparatus as described in claim 2, comprising a carrying component to hold the veneer tightly from the top and bottom and carry the same in the orthogonal direction against the joining edge, and a braking component located on the farther side from the said carrying component in a carrying direction, which holds the veneer from the top and bottom and applies the brakes to the same (claim 3), another joining apparatus as described in claim 2, comprising a carrying component to hold a veneer tightly from the top and bottom and carry the same in the perpendicular direction to the joining edge, an intermittent carrying component located on the farther carrying side from the said carrying component which holds the veneer tightly from the top and bottom and carries the same intermittently and a control system of the intermittent carrying component which halts the operation of the intermittent carrying component every time the back edge of the preceding veneer reaches the specified position of the said intermittent carrying component, and also restarts the operation of the intermittent carrying component every time the front edge of the succeeding veneer reaches the specified position (claim 4), and the other joining apparatus as described in claim 2, comprising a veneer carrying system incorporating an anvil roller with a function of receiving blade, which has a plurality of elongated grooves in a circumferential direction and carries the veneer in the orthogonal direction against the joining edge, a carrying component located on the upper side from the said anvil roller in the carrying direction and which carries the veneer to the said anvil roller, a cutting blade movably provided against the said anvil roller, a veneer detection system located on the upper side of the said cutting blade in a carrying direction, and detects unnecessary part of the veneer while being carried by the aforementioned carrying component, a rotating open-and-close classifier to close the gate for the utilizable part and open the gate for unnecessary part, located on the lower side of the aforementioned anvil roller in a carrying direction, an intermittent carrying component of which the upper side position in a carrying direction is located in parallel with the aforementioned open-and-close classifier and synchronously rotates and holds the veneer from the top and bottom, and a control system of the cutting device which temporarily halts the operations of aforementioned anvil roller, carrying component, intermittent carrying component or the like, and at the same time activates the cutting blade, then controls the said open-and-close classifier to open and close the gate alternatively (claim 5).

Also, this invention provides a joining apparatus as described in one of claims 2 to 5 for use with the adhesive material supplying system comprising a glue discharging device to apply the adhesive agent intermittently to either of the back edge face of the preceding veneer or the front edge face of the succeeding veneer (claim 6), a joining apparatus as described in one of claims 2 to 5 for use with an adhesive material supplying system comprising a glue dropping device to drop and apply the adhesive agent intermittently to a small limited area on the top face of the preceding and succeeding veneer including the joining edges (claim 7), a joining apparatus as described in one of claims 2 to 5, comprising an adhesive material supplying system incorporating an adhesive material supplying device to discharge the required length adhesive material to the top or bottom face of the preceding and succeeding veneer including the joining edge, wherein the said adhesive material supplying system is provided together with an adhesion enhancing system so as to move back and forth. (Claim 8), a joining apparatus as described in claim 8, comprising an adhesive material supplying system provided on upper and bottom sides of the carrying route (claim 9) and a joining apparatus as described in claim 8, comprising the adhesive material supplying system on either of the upper side or bottom side of the carrying route (claim 10).

Moreover, this invention provides a joining apparatus as described in one of claims 2 to 6 or claims 8 and 9 for use with the adhesion enhancing system comprising interlocking adhesion enhancing components which are symmetrically provided on the upper and bottom of the carrying route and each one contacts the veneer and separates from the veneer respectively (claim 11), and a joining apparatus as described in one of claims 2 to 5 or claims 7, 8 and 10 for use with the adhesion enhancing system comprising a movable supporting component with an adhesion enhancing function to contact the veneer and separate from the single piece on one side where the adhesive material is supplied to the veneer on the carrying route, meanwhile on the other side where the adhesive agent is not supplied to the veneer, a movable supporting component to contact the veneer and separate from the veneer activates synchronously in the symmetrical position of the adhesion enhancing component (claim 12).

Furthermore, this invention provides a joining apparatus as described in one of claims 2 to 12, comprising a control system of the adhesion enhancing device incorporating a detection system of joining edge on an appropriate position between the vicinity of the edge approaching position on the carrying route and the adhesion enhancing section, and wherein the adhesion enhancing system is moved to the position of the farthest side in a carrying direction where the joining edges are not joined and then the adhesion enhancing component is activated according to the edge detection signal of the said detection system (claim 13).

DESCRIPTION OF THE PREFERRED EMBODIMENTS

More detailed description is disclosed hereinafter according to the embodiments in this invention.

Figure 1:
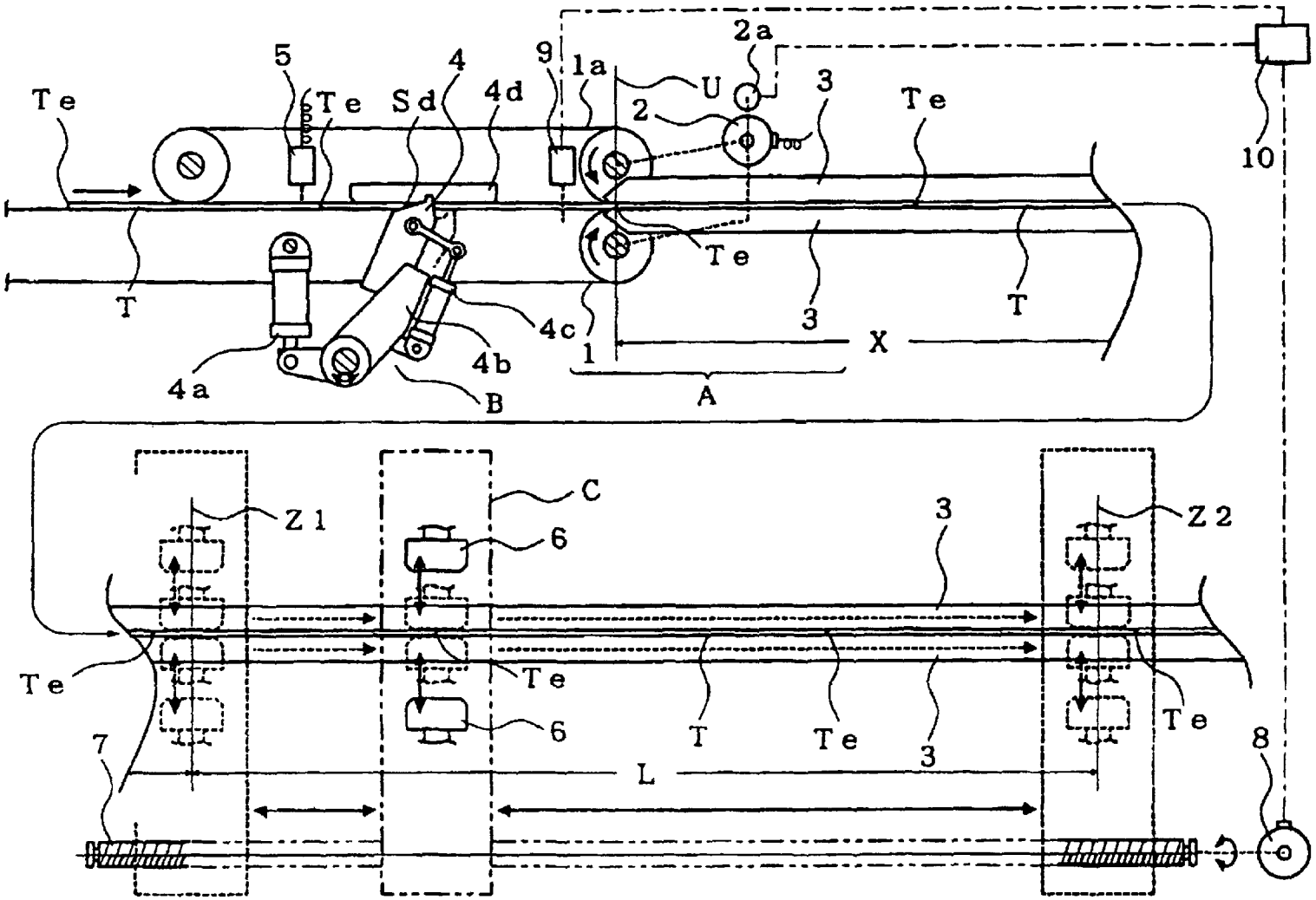
FIG. 1 shows a brief side view of the apparatus for joining single veneer piece in his invention.

In FIG. 1 showing a side view of the veneer joining apparatus in this invention, (1) and (1a) are a pair of conveyors provided up and down as a carrying component constituting part of veneer carrying system of the carrying route where the joining edge faces of the preceding veneer and succeeding veneer come close together, and run continuously (intermittently or in variation of high and low when needed) in a direction indicated by an arrow basically at a constant speed via an appropriate motor (2) such as an electric motor with speed reducer, servo motor, or the like, and thus the said pair of conveyors carry a single piece (T) in an orthogonal direction against the joining edge (Te).

(3) is a plural braking bar symmetrically provided up and down on the farther side of the aforementioned conveyors (1) and (1a) in a carrying direction as a braking component constituting other part of the single piece carrying system (A), and which supplies a braking power to the veneer (T) being successively carried on the conveyors (1) and (1a). The edge approaching position of the veneer carrying system (A) indicated in FIG. 1 is a position where the carrying power of the conveyors (1) and (1a) no more works on the veneer (T), in other words a position indicated by line (U).

(4) is a discharging type of glue applying device constituting part of the adhesive material supplying system (B) standing on the opposite side of the supporting bar (4d) to control the waving of the single piece (T), in which a portion, as indicated by full line and dot line, comprising a discharging hole (not described in the drawing) for the adhesive agent is movably provided through the level (4b) or the like so as to come out to the carrying route of the veneer (T). The said portion comprising the discharging hole for the adhesive agent comes out to the carrying route under the control system (not described in the drawing) according to the single piece detection signal sent from the veneer detection device (5) composed of light-sensitive tube, limit switch, or the like provided on the upper side of the said glue applying device (4) in a carrying direction through the action of the moving component (4d) composed of fluid cylinder or the like before the front edge of the joining veneer (T) reaches the right position, and at the same time the moving component (4d) composed of fluid cylinder or the like activates, an appropriate amount of adhesive agent (Sd) comes out of the discharging hole, after a while, the moving component (4d) activates responding to the veneer (T) passing through, and then the adhesive agent (Sd) is discharged to the front edge face of the joining veneer (T) when it is slowly entering to the farther side of the carrying route.

(6) is an adhesion enhancing component composed of part of the adhesion enhancing system (C), and comprises an adhesion enhancing function according to the feature of the adhesive agent (Sd) supplied by the aforementioned glue applying device (4). As indicated by full line and dot line, each adhesion enhancing component is provided so as to synchronously contact the veneer (T) and separate from the same veneer (T). When the adhesion enhancing system (C) movably provided moves to the position of the unjoined edge within the adhesion enhancing section of a required length (L) provided on the farther side in a carrying direction with a distance (X) away from the edge approaching position (U) of the veneer carrying system (A), in other words, within the adhesion enhancing section separated by line (Z1) and line (Z2), the moving part (not described in the drawing) composed of the fluid cylinder, crank, cam or the like by the control of the same control system (10) is activated, then the adhesion enhancing component contacts the veneer only for the period to activate the adhesive function of the adhesive agent (Sd) by the control of the control system (10) to be described hereinafter, thus the adhesion enhancing function is given to the adhesive agent (Sd).

(7) is a moving component of the adhesion enhancing system, composed of ball screw, toothed belt or the like, and which moves the adhesion enhancing system (C), by using the driving source (8) of servo motor or the like, to the farthest side in a carrying direction where the unjoined edge comes every time the unjoined edge reaches within the adhesion enhancing section indicated by (Z1) and (Z2). In other words, the adhesion enhancing system (C) is moved to the farthest side of the unjoined edge, and then continuously moved to follow the veneer (T) until the adhesion enhancing component (6) completes to apply the adhesion enhancing action.

(9) is an edge detection device composed of light-sensitive tube, limit switch or the like as a detection component to form a detection system of the joining edge, provided on the upper side in a carrying direction in the vicinity of the edge approaching position (U) of the veneer carrying system (A), and which detects that the joining edge (Te) of the veneer is approaching the edge approaching position (U), then sends the edge detection signal to the control system (10) of the adhesion enhancing device to be hereinafter described.

(10) is a control system of the adhesion enhancing device such as the aforementioned adhesion enhancing system (C), which moves the adhesion enhancing system (C), according to the edge detection signal of the aforementioned edge detection device (9), by the driving source (8) and moving component (7), to the farthest side in a carrying direction where the unjoined edge comes every time the unjoined edge reaches the adhesion enhancing section indicated by lines (X1) and (X2), by using the measured signal of the rotating measuring instrument (2a) composed of rotary encoder or the like provided on the driving source (2) of the conveyor, and controls to activate the adhesion enhancing component (6) through the driving component (not shown in the drawing) so that the adhesion enhancing component (6) should contact the veneer (T) (and the adhesive agent (Sd) if it is available) while the veneer (T) is being carried or carrying operation is halted. Also, in order to avoid the redundancy in the adhesion enhancing section, when there is no unjoined edge within the adhesion enhancing section indicated by lines (Z1) and (Z2), the mechanism should be preferably controllable to move the adhesion enhancing system (C) by priority to the uppermost position in a carrying direction within the adhesion enhancing section, i.e. the position indicated by line (Z1) so as to respond quickly to the incoming unjoined edge.

Figure 2:
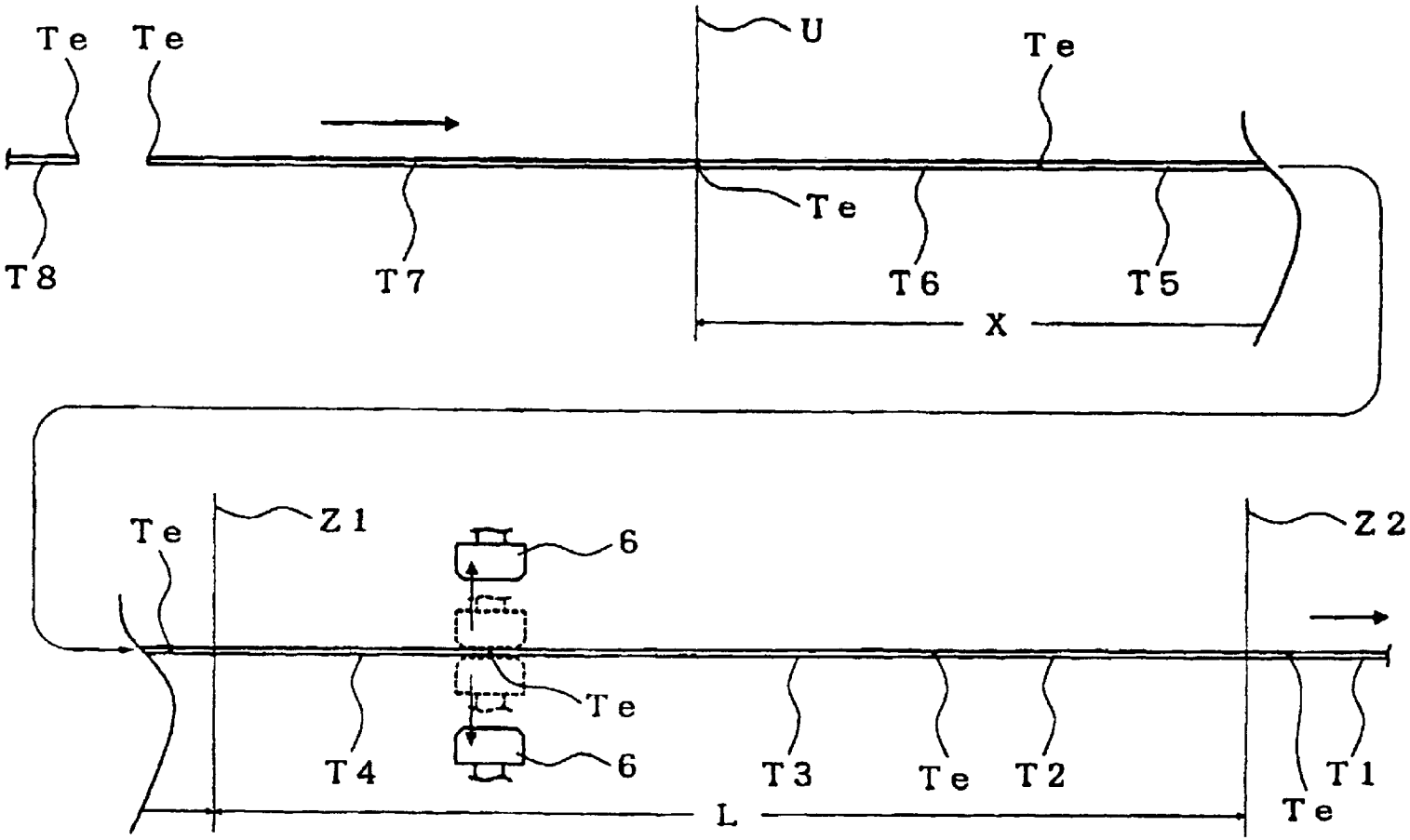
FIG. 2 shows a joining process of the veneer in this invention.
Figure 3:
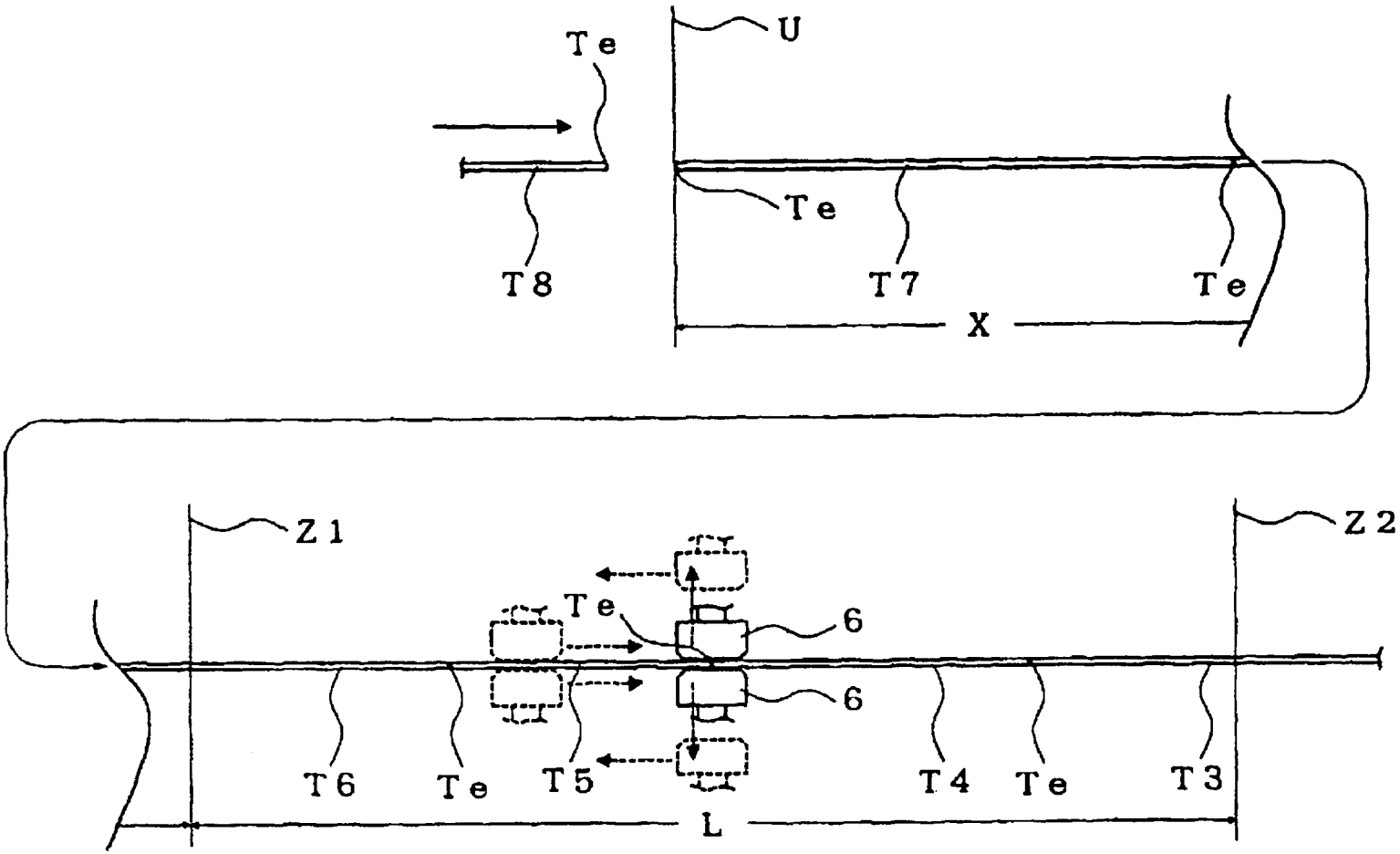
FIG. 3 shows a joining process of the veneer in this invention.

Joining method of the veneer in this invention can be realized by using the joining apparatus. Joining process is described below by defining the correlative position of each veneer and adhesion enhancing component. For instance, as shown in FIG. 2, when veneer (T1) to (T8) are successively joined, if the wide single piece (T7) (more exactly, the front edge face of the veneer (7) on which the adhesive agent (Sd) is applied by the glue supplying device (4) of the adhesive material supplying system (B)) reaches the edge approaching position (U), and continuously carried immediately after the adhesion enhancing component (6) which has completed joining the edges of the veneers (T3) and (T4) returns to the position indicated by full line, edges, as shown in FIG. 3, two unjoined edges of the veneers of (T4) and (T5), and (T5) and (T6) reach within the adhesion enhancing section indicated by the lines (Z1) and (Z2). However, the adhesion enhancing component (6) acts to supply the adhesion enhancing action to the joining edge of the veneers (T4) and (T5) first, then to the joining edge of the veneers (T5) and (T6) since the control system (10) always moves the adhesion enhancing system (C) to the position of the unjoined edge located on the farthest side in a carrying direction.

Figure 4:
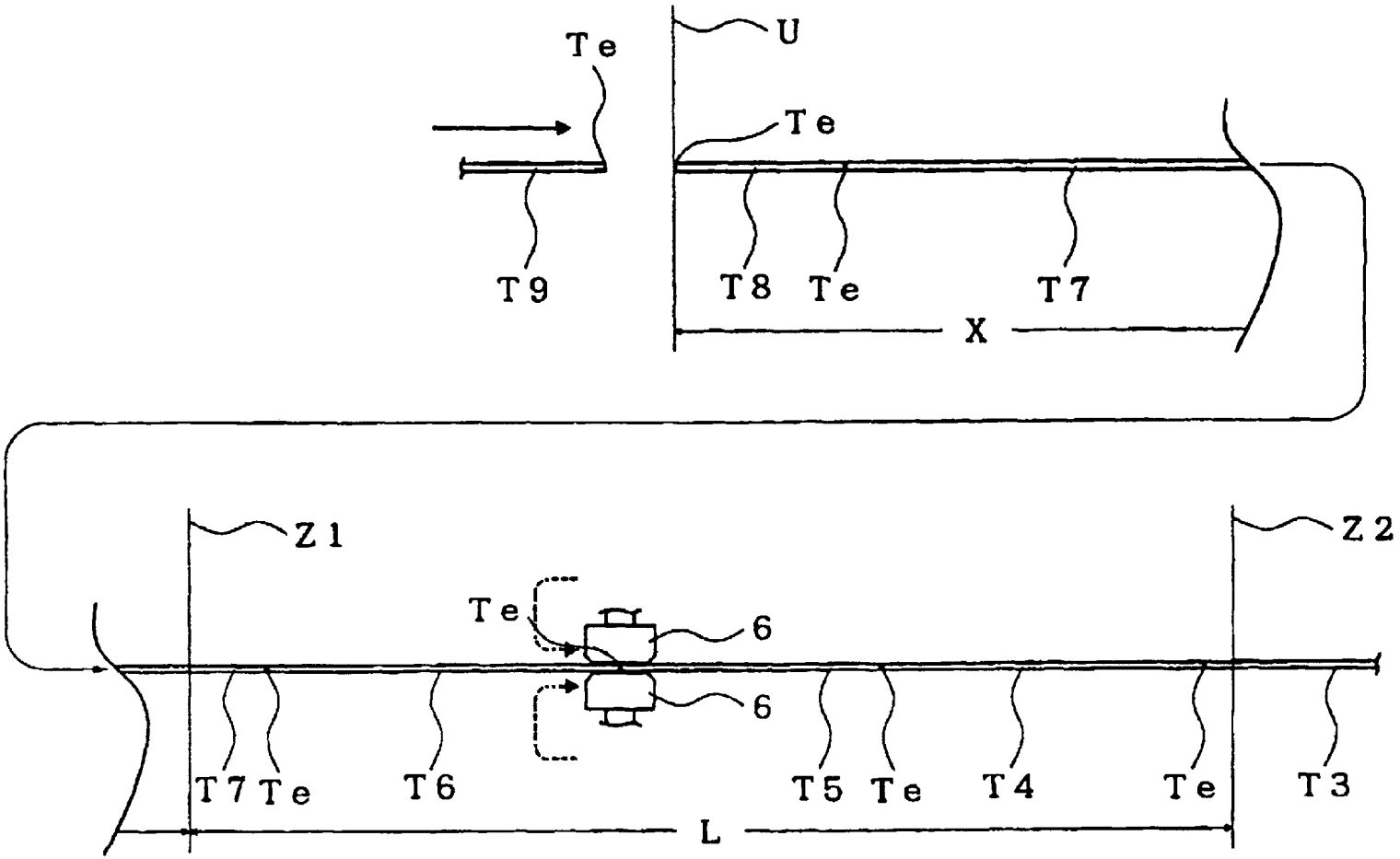
FIG. 4 shows a joining process of the veneer in this invention.

The joining condition may change due to the feature of the adhesive agent supplied, the width of the succeeding veneer, or the like. There are two cases where the adhesive function is activated and not activated to the adhesive agent while the veneer is being carried, by the action that the adhesion enhancing component supplies the adhesion enhancing action to the veneer while being carried. If the adhesion enhancing action, as shown in FIG. 3, is continuously supplied to the single piece (T7) until the veneer (T7) is completely carried, the adhesion enhancing component (6) shifts to the position in a farther side in a carrying direction than the position described in FIG. 2, and the next position of the adhesion enhancing component (6) is greatly concerned. However, as shown in FIG. 4, if the succeeding veneer (T8) has a narrow width, the position of the adhesion enhancing components (6) which supply the adhesion enhancing action to the joining edge of veneers (T5) and (T6) shift to the upstream side in a carrying direction than the position indicated in FIG. 3. Therefore, any particular problem does not arise.

Figure 5:
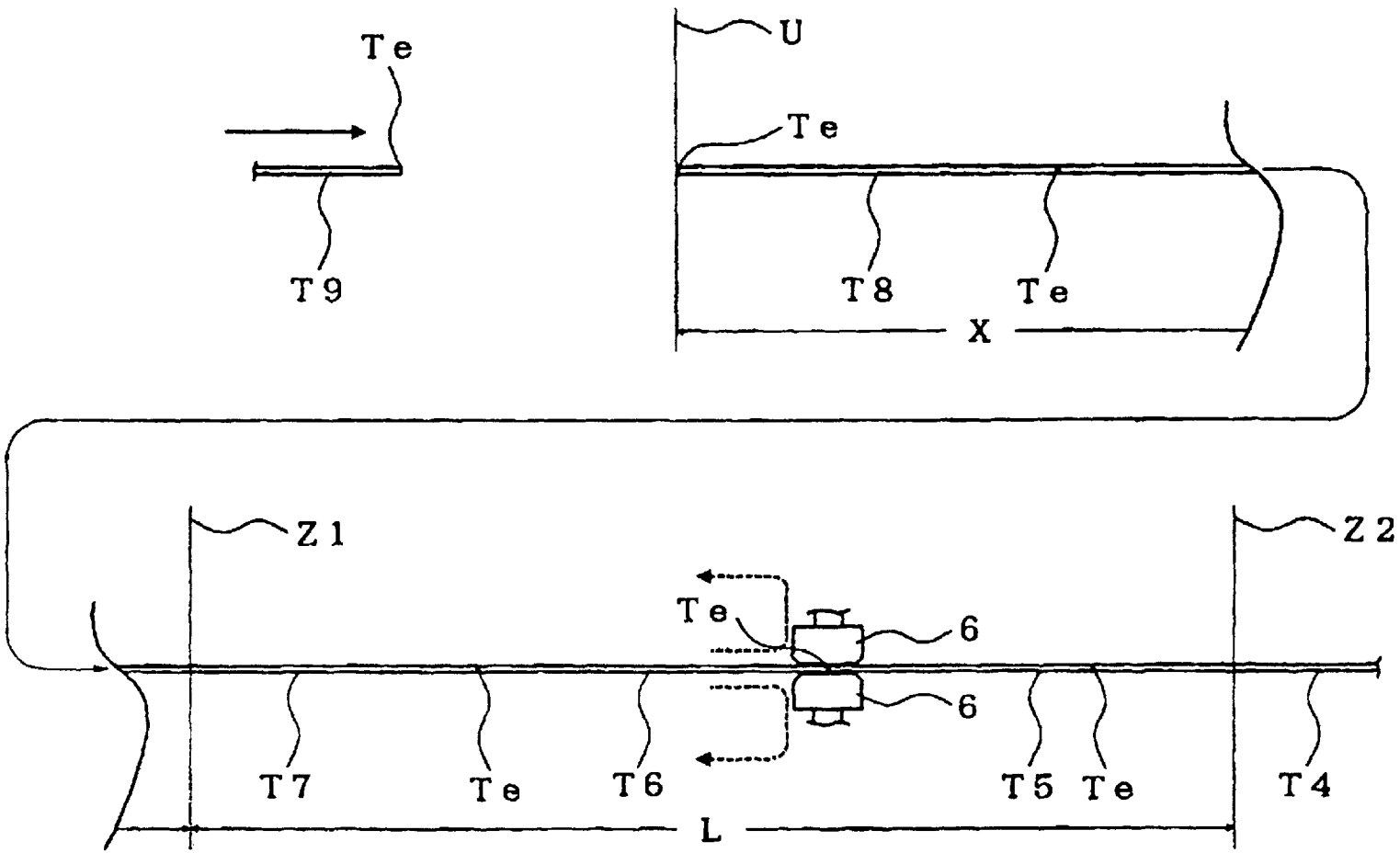
FIG. 5 shows a joining process of the veneer in this invention.

On the other hand, as shown in FIG. 5, if the succeeding veneer (T8) is a wide piece or the like, the position of the adhesion enhancing component (6) while supplying the adhesion enhancing action to the joining edge of the veneers (T5) and (T6) may shift to the farther side in a carrying direction than the position indicated in FIG. 3. In this case, however, if carrying the succeeding veneer (T9) is delayed, the position of the adhesion enhancing component (6) can complete joining the edges of veneers (T5) and (T6) and shift to the position of the joining edges of the veneers (T6) and (T7) a little earlier than the timing when the front edge face of the said succeeding veneer (T9) reaches the edge approaching position (U). Therefore, there seems no particular problem. Also as the same as the description in the previous paragraph, the next succeeding veneer (T9) is a narrow width, the position of the adhesion enhancing component (6) for supplying the adhesion enhancing action to the joining edges of the veneers (T6) and (T7) shifts to the farther side in a carrying direction than the position indicated in FIG. 5. Therefore, there seems no particular problem here, either.

Thus, wide single pieces and narrow single pieces are mixed in the actual joining process, or carrying the succeeding veneer is frequently delayed in the actual joining process. By providing the adhesion enhancing section with an appropriate length, the position of the adhesion enhancing component hardly come out of the adhesion enhancing section. As clearly described in the afore-mentioned description, in consequence, this joining method can be executed regardless of one process in which the joining edges of the preceding and succeeding veneers approach with each other, and the other process in which the adhesion enhancing action in applied to the adhesive material. In general, this method can create more effective productivity, and obtain sufficient time to activate the adhesive function to the adhesive material. Therefore, it is not necessary to attach too much importance on an immediate effect, and it becomes possible to use an adhesive agent comprising an appropriate performance for the main part of the adhesive materials. Thus, it becomes possible to obtain a better joining process than the former invention does.

However, the joining apparatus in this invention comprises a single piece carrying system which forms carrying route to make the joining edges of the preceding and succeeding veneers get close on the way to carry the single piece in an orthogonal direction against the joining edges, an adhesive material supplying system to supply the adhesive material intensively to a portion between the joining edges of the preceding and succeeding veneers, or one portion within the small limited portion on the top and bottom faces of each single piece including the joining edges, and an adhesion enhancing system comprising an adhesion enhancing component to supply the adhesion enhancing action to the adhesive material. This apparatus can be used for joining the veneer in this invention if the adhesion enhancing system comprising the aforementioned adhesion enhancing component is at least a joining apparatus which incorporates a control system of the adhesion enhancing device which is equipped movably back and forth within the adhesion enhancing section with a specific length provided on the farther side in a carrying direction than the edge approaching position in the carrying route, and also which moves the adhesion enhancing system to the unjoined edges located on the farthest side in a carrying direction responding to the unjoined edges arriving in the said adhesion enhancing section, controls to activate the adhesion enhancing component for supplying the adhesion enhancing action to the adhesive material while the single piece is being carried or halted. This apparatus is not limited in the configuration as indicated in FIG. 1, and the design can be changed or replaced to other different embodiments. Other typical embodiments are described hereinafter.

Figure 6:
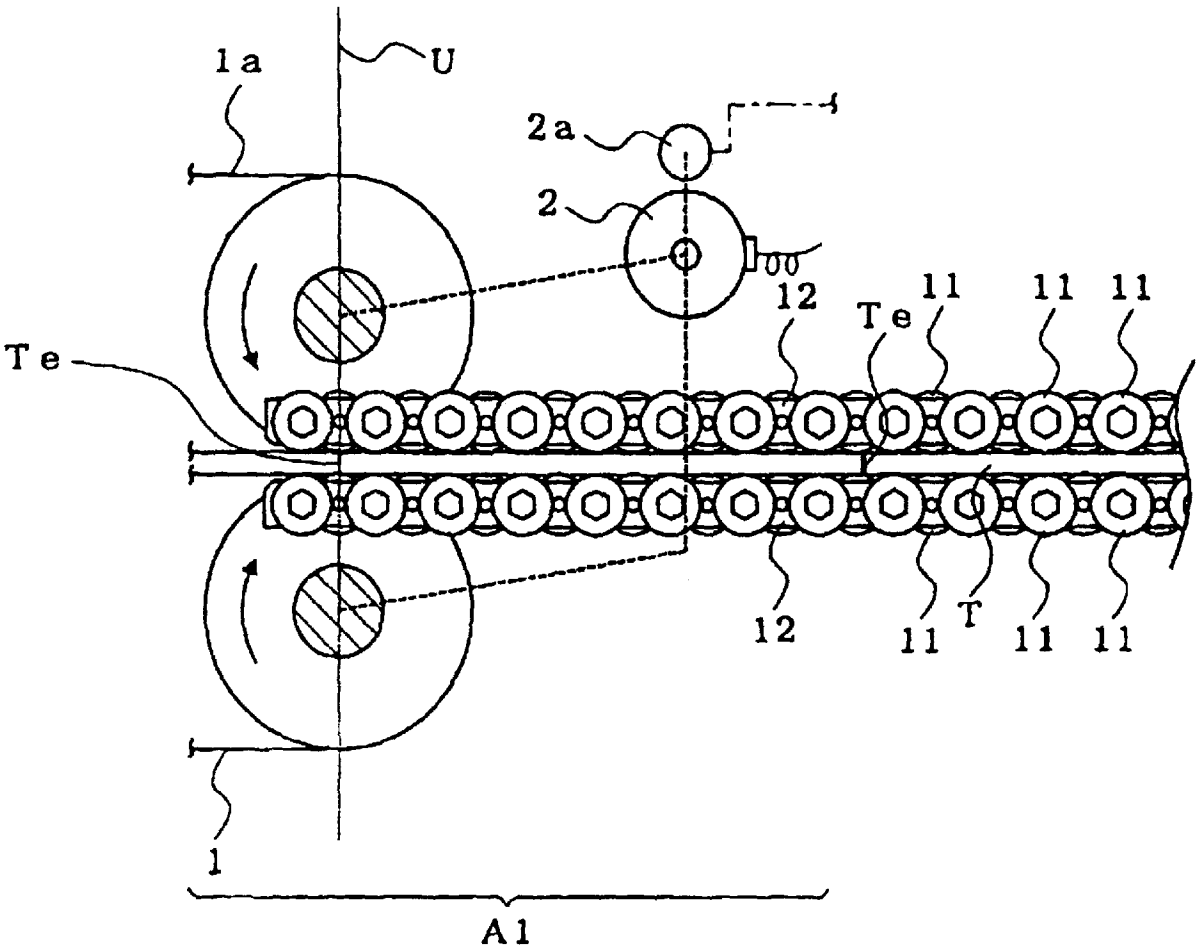
FIG. 6 shows a brief side view of other embodiment of the veneer carrying system in this invention.
Figure 7:
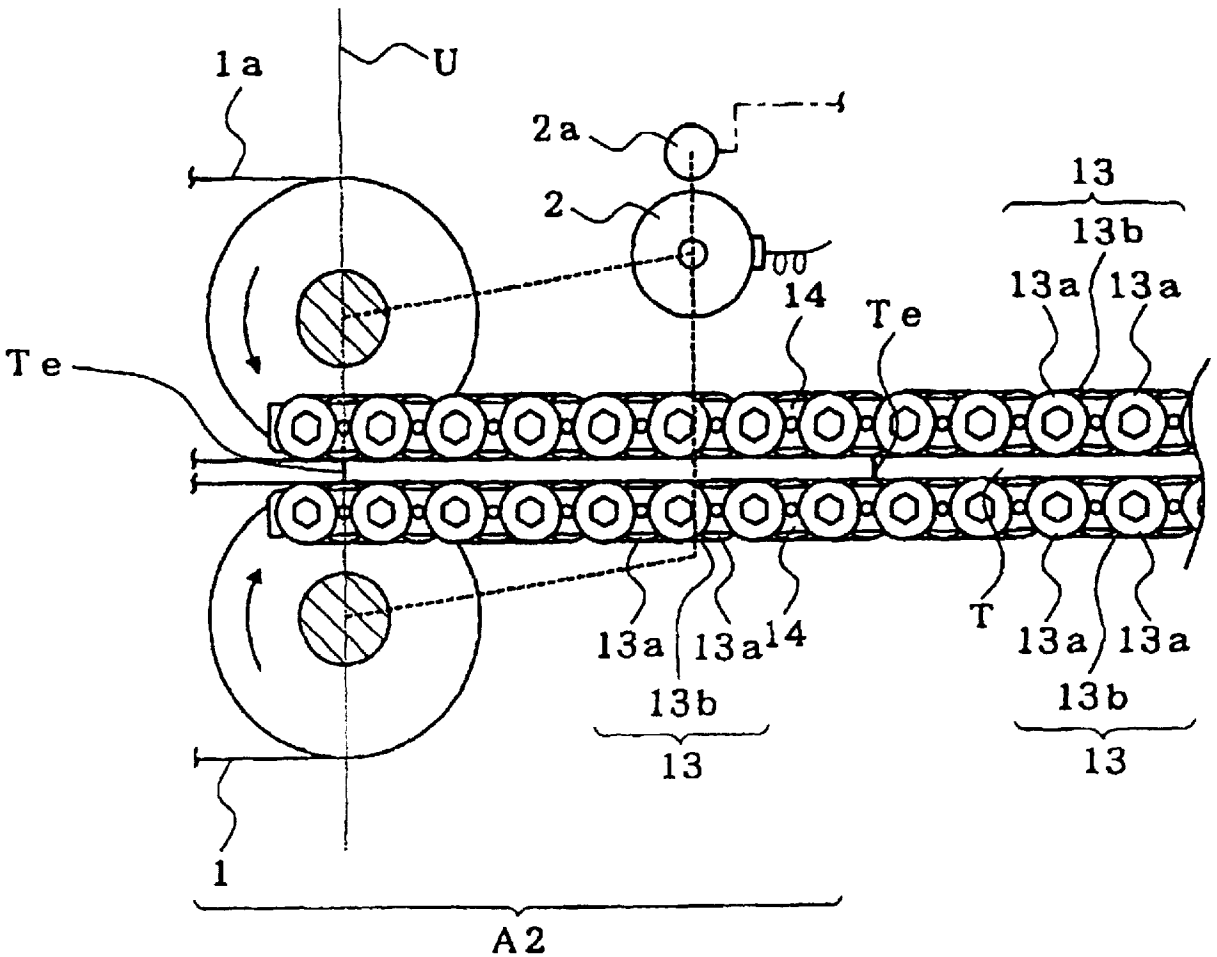
FIG. 7 shows a brief side view of other embodiment of the veneer carrying system in this invention.

The single piece carrying system (A) of the joining apparatus indicated in FIG. 1 is publicly known in the prior art (Japanese publication No. S46-40560). There are two other examples similar to the said single piece carrying system (A). One is the veneer carrying system (A1), as shown in FIG. 6, which comprises a rotating control bar (12) as a braking component, pivoting a plurality of roll shaped carrying rotor (11) at appropriate intervals, instead of using the shifting type of the braking bar (3) in the aforementioned single piece carrying system (A). The other is a veneer carrying system (A2), as shown in FIG. 7, which comprises a rotating brake bar (14) as a braking component, pivoting a plurality of carrying rotor (13) composed of non-edge belt (13b) such as belt chain or the like provided on the rotor (13a) such as roll chain or the like (refer to the Japanese publication No. S41-1588), and which can make the edges get close more easily than the shifting type. Those two systems can be used for the veneer carrying system of the joining apparatus in regard to this invention.

Figure 8:
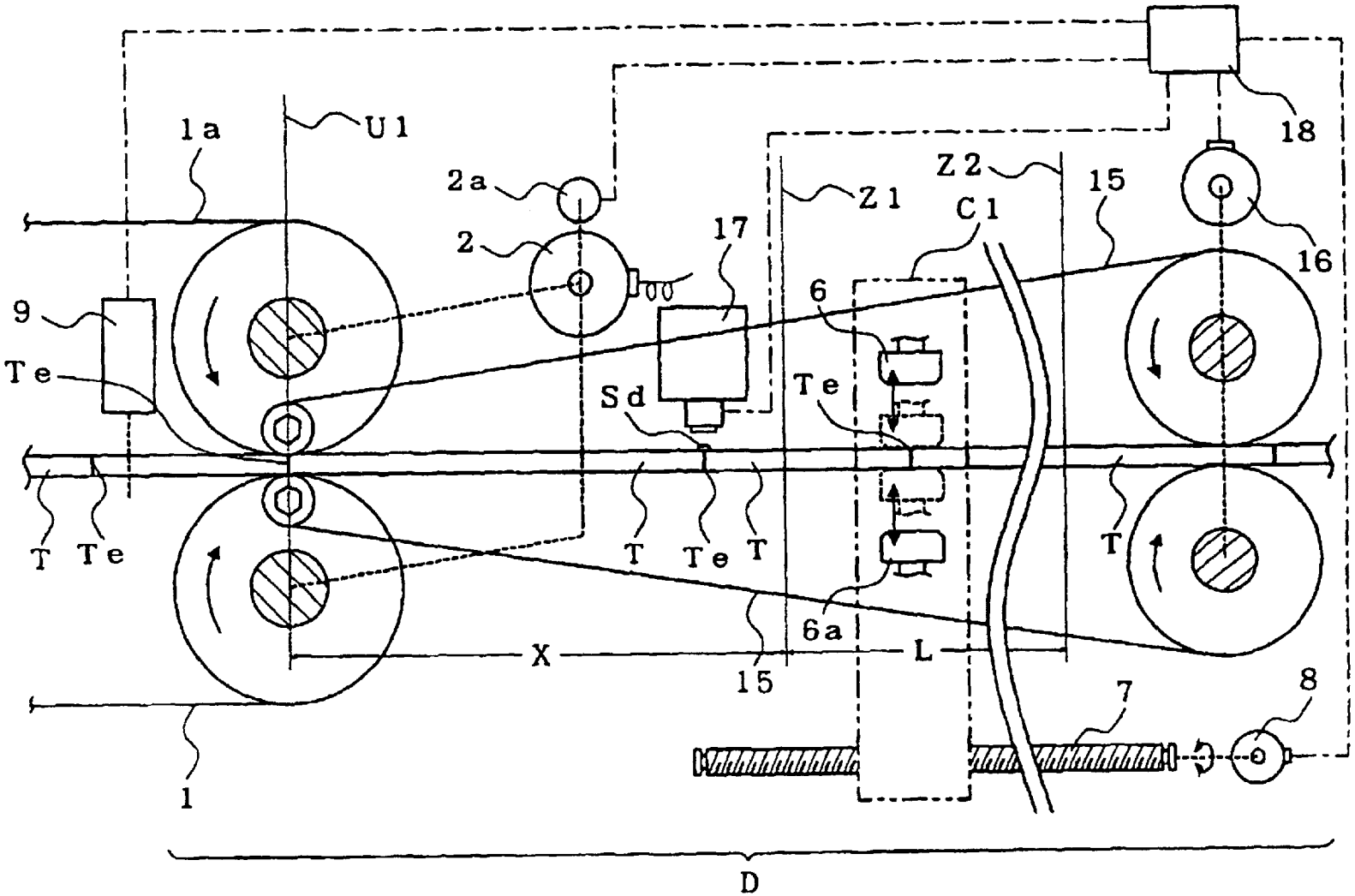
FIG. 8 shows a brief side view of the veneer joining apparatus as other embodiment in this invention.

Also the synchronous operation type of the veneer carrying system as shown in FIG. 8 can be replaced for the aforementioned braking types of the veneer carrying system. In other words, in FIG. 8 showing a brief side view of the other embodiment of the single piece joining apparatus in this invention, (6a) is a supporting component forming part of the adhesion enhancing system (C1) similar to the adhesion enhancing system (C) of the joining apparatus as shown in FIG. 1, and as indicated by full line and dot line, is provided so as to contact and separate from the veneer (T) synchronously moving in the symmetric position against the adhesion enhancing component (6) comprising the required adhesion enhancing function, receives the movement of the appropriate moving component (not indicated in the drawing), while the adhesion enhancing system (C1) is moving to the joining edges of the unjoined edges by the control system (18) to be described hereinafter, contacts the veneer (T) only while the adhesion enhancing component (6) activates the adhesive agent (Sd) for the adhesive function, thus helps the adhesion enhancing component (6) supply the adhesion enhancing action.

(15) is an intermittent conveyor provided up-and-down and symmetrically, provided on the farther side in the carrying direction of a pair of conveyors (1) and (1a) up-and down and symmetrically located, constituting other part of the veneer carrying system (D) as an intermittent carrying system constituting part of the single piece carrying system (D) which is synchronously operated, and which intermittently shifts to the direction marked by an arrow in the drawing via an appropriate driving source (16) such as servo motor or the like every time the veneer (T) is carried into the said intermittent conveyor (15) via a conveyors (1) and (1a) under the control of the control system (18) to be described hereinafter, then the veneer (T) is tightly held from up and bottom and intermittently carried. In addition, the edge approaching position of the veneer carrying system (D) indicated in FIG. 8 is a border line where carrying power of the conveyors (1) and (1a) is counterchanged with the carrying power of the intermittent conveyor (15) in regard to the veneer (T), i.e. the position which is indicated by a line (U1).

(17) is a dropping type of a glue applying device provided on the farther side in a carrying direction of the edge approaching position (U1), and supplies an appropriate amount of the adhesive agent (Sd) in a form of drop (if necessary, in a form of mist, thin thread or the like) to a small limited area on the top surface of each veneer (T) including the joining edge (Te) (preferably, the joining edge (Te) should be located in the center) every time the joining edge (Te) of each veneer (T) carried via the intermittent conveyor (15) passes right under the said glue applying device (17) under the control system (18) to be described hereinafter.

(18) is a control system incorporating a control function of the intermittent conveyor (15), the glue applying device and the adhesion enhancing device such as the adhesive detection device (9) provided on the upper side in a carrying direction of the edge approaching position (U1), and by using a measuring signal of the rotating measure (2a) provided on the driving source (2) of the conveyor, a timing signal of the timing device (drawing omitted) composed of timer or the like, which halts the actuation of the intermittent conveyor (15) every time the back edge of the preceding veneer (T) approaches the edge approaching position (T1), reactivates the intermittent conveyor (15) every time the front edge of the succeeding veneer (T) carried in via the conveyors (1) and (1a), activates the glue applying device (17) to supply an appropriate amount of the adhesive agent (Sd) to a small limited area including the said joining edge (Te) every time the joining edge (Te) of the veneer (T) intermittently carried via the intermittent conveyor (15) passes right under the glue applying device (17), and as the same as the control system (10) of the joining apparatus as shown in FIG. 1, moves the adhesion enhancing system (C1) via the driving source (8) and moving component (7) to the position to process the unjoined edges located on the farthest side in a carrying direction every time the unjoined edges arrive within the adhesion enhancing section divided by lines (Z1) and (Z2), at the same time, controls to activate the adhesion enhancing component (6) and supporting component (6a) via the moving component not indicated in the drawing (its control circuit or the like not indicated in the drawing, either) so that the adhesion enhancing component (6) and supporting component (6a) can contact the veneer (T) only during the time required (in case where the adhesive agent (Sd) is supplied, the adhesion enhancing component (6) and supporting component (6a) should contact the single piece pressing the adhesive agent (Sd)).

Using such a joining apparatus configured as described above makes it possible to get the joining edge (Te) between the preceding single piece (T) and succeeding veneer (T) closer, supply an appropriate amount of the adhesive agent (Sd) to a small limited area on the top surface of each veneer (T) including the joining edge (Te), supply the adhesion enhancing action to the adhesive agent (Sd) without any particular problem after processes based on each process indicated in FIGS. 2 to 5, thus join the single piece efficiently together with the adhesive agent comprising an appropriate performance. Furthermore, using the aforementioned single piece carrying system synchronously operated deactivates the excessive braking power, therefore, joining edge can approach more smoothly than the operation by the aforementioned braking type of the single piece carrying system.

If the timing for the intermittent conveyor (15) to restart is controlled to become slightly faster than the timing for the front edge of the succeeding veneer (T) to approach the edge approaching position (U1), a small clearance can be created between the edges of the preceding piece and succeeding piece. To the contrary, if the timing for the intermittent conveyor (15) to restart is controlled to become slightly slower than the timing for the front edge of the succeeding veneer (T) to approach the edge approaching position (U1), a side pressure can be liberated between the edges of the preceding single piece and succeeding single piece. The aforementioned small clearance can prevent the joining edges from overlapping in the gluing process while the pieces are formed to become plywood or the like. Also the aforementioned liberation of the side pressure is efficient to spread the adhesive agent between the joining edges if the glue applying device (4) of the joining apparatus as shown in FIG. 1 is changed into the glue applying device (17) of the joining apparatus as shown in FIG. 8.

Figure 9:
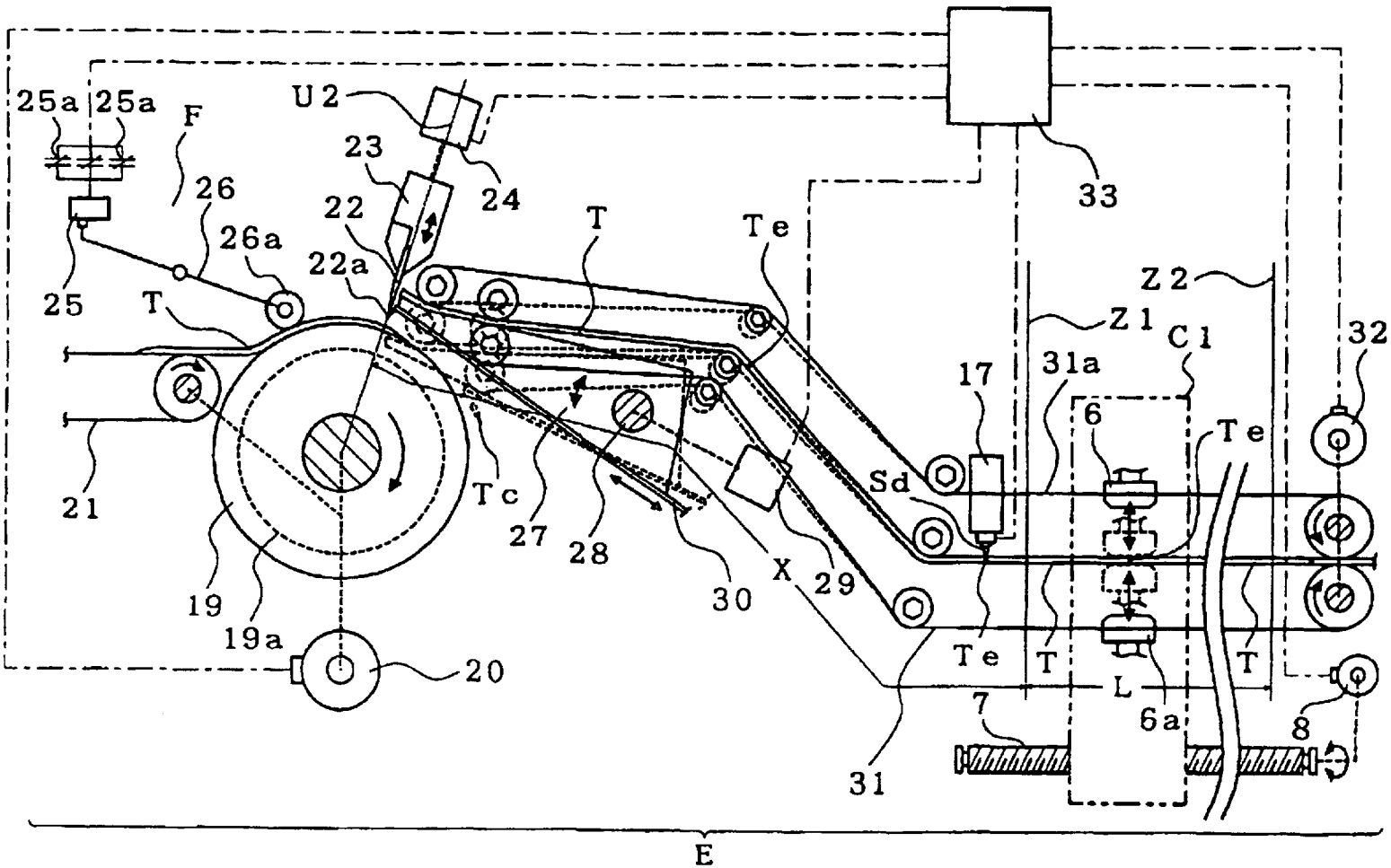
FIG. 9 shows a brief side view of the veneer joining apparatus as other embodiment in this invention.

On the other hand, each of the aforementioned single piece carrying systems has a mechanism to cut the single piece and remote unnecessary part of irregularly shaped ends and to process the veneer in a required shape. However, another single piece carrying system incorporating a mechanism to cut and remove the irregularly shaped ends, in regard to the system comprising a sliver cutting and removing device in which the joining edges of the preceding and succeeding veneers closely contact on the same position where the sliver is cut and removed, widely known in the publication (Japanese patent publication Nos. S50-11143 and S53-1327 and utility model publication No. S50-128371) can be also used for the joining apparatus in this invention. As an example of the said device for cutting and removing the irregularly shaped ends, an anvil roller type of the single piece carrying system as shown in FIG. 9 is suggested. In other words, in FIG. 9 showing a brief side view of other embodiment regarding the veneer joining apparatus, (19) is an anvil roller incorporating another function to receive a blade, provided as a carrying component constituting part of the veneer carrying system (E), and incorporates a plurality of circumferential thin groove (19a) at an appropriate interval in a direction of center core, wherein at the same time, preferably, rubber coating or the like is provided on the peripheral area to protect (the cutting blade from damage), and is accordingly activated to rotate intermittently in a direction indicated by an arrow via an appropriate driving source (20) composed of a servo motor or the like under control of the control system (33) to be described hereinafter and to carry intermittently the single piece in an orthogonal direction of the joining edge (Te).

(21) is a conveyor as a carrying component located on the upper side in a carrying direction, and is activated to rotate intermittently in a direction as indicated by an arrow at a speed to attune in accordance with the movement of the anvil roller (19) via the same driving source (20) (or the same type of driving source not indicated in the drawing) as the anvil roller (19) under control of the control system (33) to be described hereinafter.

(22) is a pair of cutting blade provided on the diagonally upper side of the anvil roller (19), is accordingly reciprocated in a direction as indicated by an arrow via a working system (24) or the like composed of cam crank or the like, under control of the control system (33) to be described hereinafter, and cuts in the border line between the utilizable part and unnecessary part (Tc) of the veneer (T) when the blade edge (22a) contacts the anvil roller (19).

(25) is a veneer detection device composed of a plurality of limit switch and light-sensitive tube provided in parallel on the upper side in a carrying direction of the aforementioned cutting blade (22) as a detection component constituting part of the veneer detection system (F) which detects the border line between the utilizable part and unnecessary part (Tc) of the veneer (T) carried on the conveyor (21), and which detects the arrival of the utilizable part of the veneer (T) if contact points (25a) which are originally ON turn all OFF while a lever (26) with a roller (26a) constituting other part of the single piece detection system (F) is oscillating as the single piece (T) is carried. To the contrary, if one of the contact points (25a) which are all OFF turns ON, the single piece detection device (25) detects the arrival of the utilizable part of the veneer (T), and sends each veneer detection signal to the control system (33) to be described hereinafter. The border line between the utilizable part and unnecessary part (Tc) of the veneer (T) which is detected by the veneer detection device and cut by the cutting blade (22) eventually turns the joining edge (Te) of the veneer (T). Therefore, the veneer detection system (F) is substantially a detection system of the joining edges as well.

(27) is an open-and-close classifier movably provided on the farther side in a carrying direction against the aforementioned anvil roller (19) so that the forefront of the open-and-close classifier can appear on the thin groove (19a) from a supporting axis (28) as the fixed end as indicated by full like and dot line, and is accordingly oscillated in a direction as indicated by an arrow in FIG. 9 via the working system (29) composed of cam, fluid cylinder, or the like, under control of the control system (33) to be described hereinafter, thus, alternatively opens and closes the way for the necessary and unnecessary parts of the single piece to go further.

(30) is an irregularly shaped ends (sliver) removing bar provided on the farther side of the aforementioned open-and-close classifier, which is oscillated in a direction as indicated by an arrow in FIG. 9, via the working system (omitted to be shown in FIG. 9) which moves in accordance with the oscillating movement of the aforementioned open-and-close classifier, as indicated by full line and dot line, and then facilitates the unnecessary part (Tc) on the front edge of the veneer (T) dropping.

(31) and (31a) are a pair of intermittent conveyor provided up and down, constituting other part of the veneer carrying system (E), wherein, as indicated by full line and dot line, a portion on the upper side in a carrying direction is located in parallel to the aforementioned open-and-close classifier (27) so as to synchronously move. The said pair of intermittent conveyors (31) and (31a) are activated to run intermittently in a direction as indicated by an arrow via the appropriate driving source (32) such as a servo motor or the like every time the utilizable part of the veneer (T) is carried to the farther side in a carrying direction against the cutting blade (22) under control of the control system (33) to be described hereinafter, then carries the veneer (T) intermittently holding tight from the top and bottom. The edge approaching position of the single piece carrying system (E) as shown by an example in FIG. 9 is equal to the cutting path of the blade edge (22a) of the cutting blade (22), i.e. the position indicated by line (U2).

(33) is a control system comprising control functions of the cutting processor such as the aforementioned anvil roller (19), cutting blade (22), open-and-close classifier (27), intermittent conveyors (31) and (31a) or the like, the glue applying device (17) and the adhesion enhancing device such as adhesion enhancing system (C1) or the like, wherein, every time the border line between the utilizable part and unnecessary part (Tc) reaches the position of the cutting blade (22) by using the measuring signal of the rotating measuring device (omitted to be shown in drawing) provided inside the driving system of the anvil roller (19) or timing signal or the like of the timing device composed of a timer or the like, according to the veneer detection signal of the single piece detection device (25) in the aforementioned single piece detection system (F), temporarily stops the movement of the anvil roller (19), conveyor (21), intermittent conveyors (31) and (31a) or the like, activates the cutting blade (22), and controls alternatively to open and close the aforementioned open-and-close classifier (27). In addition, the said control system (33) activates the said glue applying device (17) every time the joining edge (Te) of the veneer (T) carried intermittently passes right under the glue applying device (17) as the same as the control system (18) of the joining apparatus as exemplified in FIG. 8, and every time the unjoined edge reaches within the adhesion enhancing section as indicated by lines (Z1) and (Z2), moves the adhesion enhancing mechanism (C1) to the position of the unjoined edges located on the farthest side in a carrying direction all the time, and controls to activate the adhesion enhancing component (6) and supporting component (6a) while the veneer (T) is being carried or halted.

Figure 10:
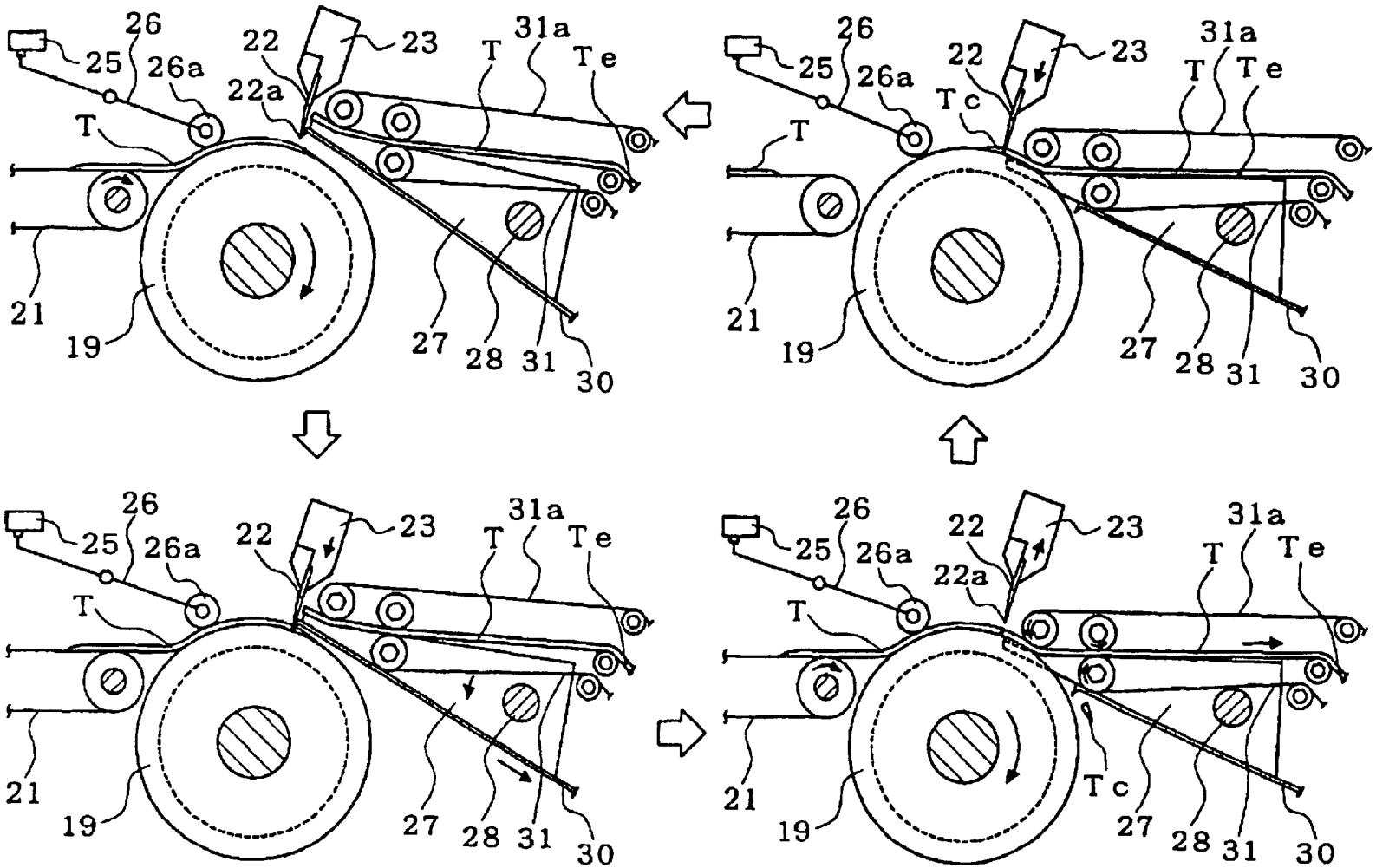
FIG. 10 shows sketches to describe the joining process of the joining apparatus disclosed in FIG. 9.

In this section, a series of movement of the aforementioned veneer carrying system (E) is described according to the explanation drawing in FIG. 10. In starting the joining apparatus, the control system (33) controls to make the cutting blade (22), open-and-close classifier (27), irregularly shaped ends removing bar (30) or the like return to the waiting position as indicated by an arrow in FIG. 9, i.e. to the waiting position as indicated in the upper left drawing of FIG. 10, and, at the same time, controls to rotate the anvil roller (19) and conveyor (21) in a direction as indicated by an arrow until the border line between the utilizable part and unnecessary part (Tc) on the front edge of the veneer (T) detected by the veneer detection device (25) reaches the position of the cutting blade (22).

Then the border line between the utilizable part and unnecessary part (Tc) on the front edge of the veneer (T) reaches the position of the cutting blade (22), and as shown in the bottom left drawing of FIG. 10, the control system (33) stops the anvil roller (19) and conveyor (21), moves the cutting blade (22) to the anvil roller (19), moves the open-and-close classifier (27) in a direction as indicated by an arrow, then at the same time, controls to move the irregularly shaped ends removing bar (30) in a direction as indicated by an arrow. Thus, the unnecessary part (Tc) on the front edge is cut and separated and facilitated to be dropped obliquely down under the anvil roller (19).

Figure 20:
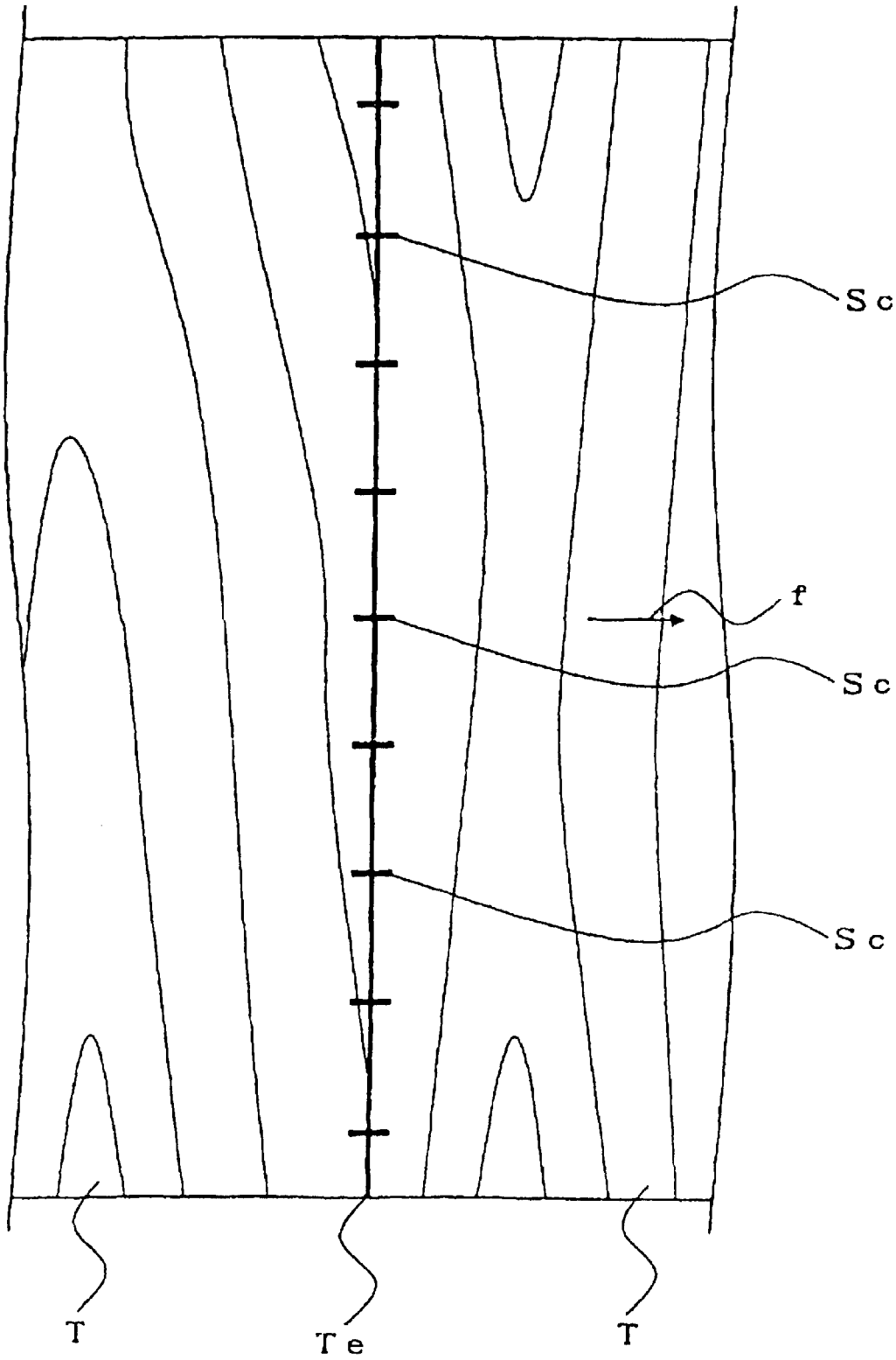
FIG. 20 RELATED ART
FIG. 20 shows a flat view to describe how to apply the adhesive material to the veneer.
Figure 21:
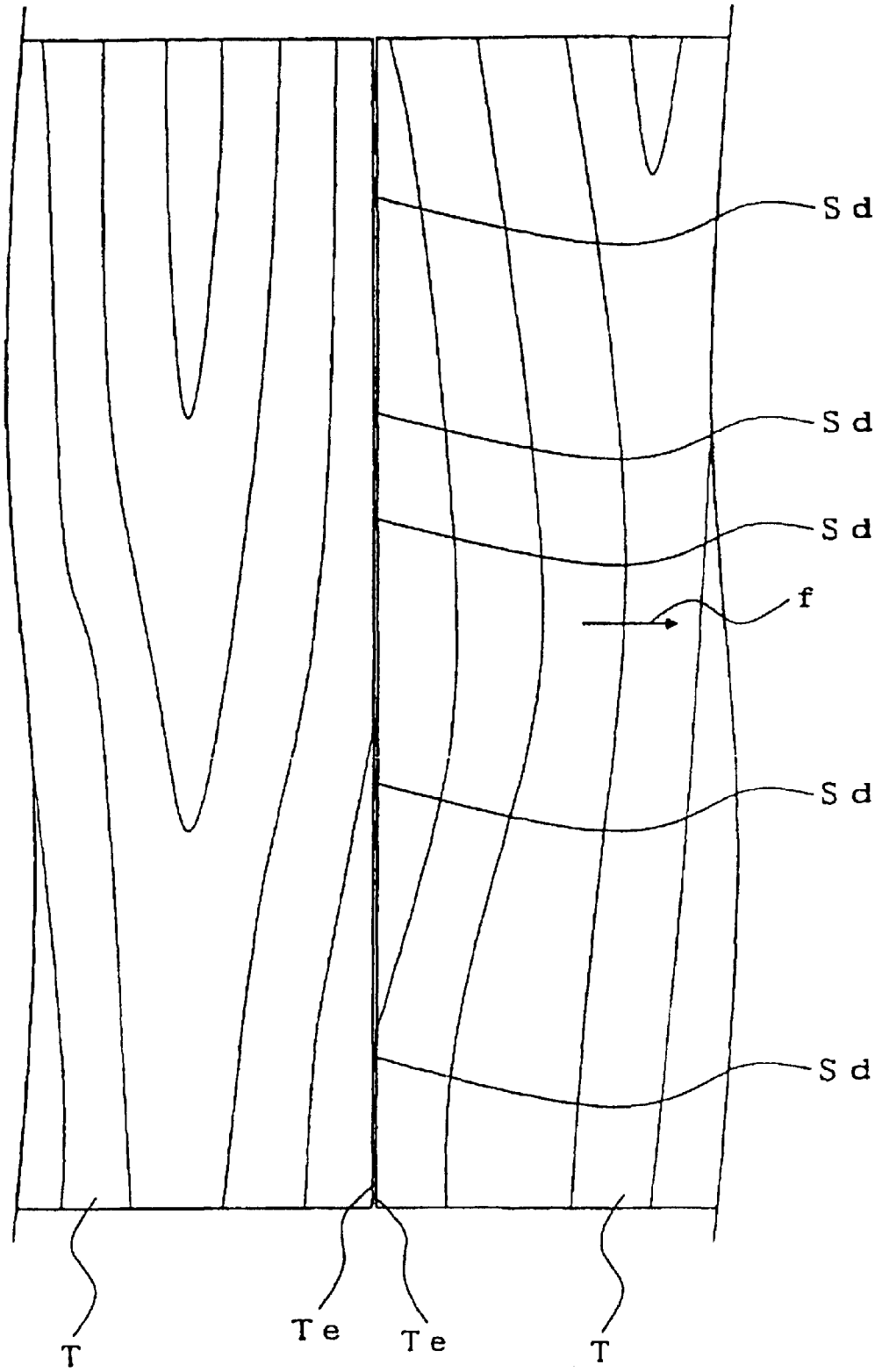
FIG. 21 RELATED ART
FIG. 21 shows a flat view to describe how to apply the adhesive material to the veneer.

Next, as shown in FIG. 20, when the control system (33) moves the open-and-close classifier (27) to the position where the front edge of the open-and-close classifier (27) sinks inside the anvil roller (19), and at the same time brings the cutting blade (22) back to the waiting position, then controls to rotate the anvil roller (19), conveyor (21), intermittent conveyors (31) and (31a) or the like in a direction as indicated by an arrow in FIG. 10, the joining edges of the preceding veneer (T) and the preceding veneer (T) get closer with each other, then are carried in a direction as indicated by an arrow in FIG. 10. Also, as well as the aforementioned single piece carrying system (D), the timing for the intermittent conveyors (31) and (31a) to restart is accordingly controlled to become slightly faster or slower than the timing for the anvil roller (19) to restart so that a clearance or side pressure can be created between the joining edges.

Next, when the border line between the utilizable part and unnecessary part (Tc) on the back edge of the veneer (T) detected by the veneer detection device (25) reaches the position of the cutting blade (22), the control system (33), as shown in the right upper drawing in FIG. 10, stops the rotation of the anvil roller (19) and conveyor (21), and controls the cutting blade (22) to rotate against the anvil roller (19), the unnecessary part (Tc) on the back edge is cut and separated.

And as shown in the upper left drawing in FIG. 10, when the control system (33) returns the cutting blade (22), open-and-close classifier (27), irregularly shaped ends removing bar (30) or the like to the waiting position, and controls the anvil roller (19) and conveyor (21) to rotate in a direction as indicated by an arrow, the unnecessary part (Tc) on the back edge drops obliquely down under the anvil roller (19), and at the same time the border line between the utilizable part and unnecessary part (Tc) on the front edge of the veneer is detected by the veneer detection device, and then reaches the position of the cutting blade (22). After this, the same operation is repeated under the same control system, in other words, unnecessary part of each veneer is successively cut and removed downward, the joining edges between the preceding and succeeding veneers approach each other and then, carried to the following adhesion enhancing section.

Also, a group of the veneers which have been joined by the joining apparatus (joining method) in this invention, although the drawing is omitted, can be used as usual for forming plywood or the like by cutting into a required size through the cutting device provided on an appropriate position around the farther side in a carrying direction of the joining apparatus. However, in case where the aforementioned veneer carrying system with an irregularly shaped ends removing mechanism is used as a veneer carrying system, besides the process of cutting the border line between the utilizable part and unnecessary part of the veneer, another control mechanism may be accordingly adapted to activate the cutting blade to cut the veneer into a required length and halt the adhesive material supplying system's operation of supplying the adhesive material to the portion which has been cut into the required length every time the length of each group of the veneers whose joining edges getting close reaches the required length so that the cutting device to cut the veneer into the required length can be omitted. Furthermore, according to the control system of the joining apparatus as shown in the aforementioned FIG. 8, if the timing of the intermittent conveyor is controlled to become slightly faster than the timing of the anvil roller, a certain clearance can be purposely created on the portion which is cut into the required length. And even if carrying the group of the veneers shows an accidental error while being carried, such errors are not accumulated.

As clearly described in the above paragraph, for the veneer carrying system of the apparatus in this invention, it is sufficient to establish a carrying route to make the joining edges between the preceding and succeeding veneers closer on the way to carry the single piece in a perpendicular direction to the joining edge, also the length of the adhesion enhancing section, distance between the edge approaching position and adhesion enhancing section, or the like can be accordingly set considering a mechanical structure or the like in regard to the adhesive material supplying system and adhesion enhancing system. Moreover, if necessary, appropriate mechanisms are accordingly combined as well as alterations and replacements of designs for the adhesive material supplying system and adhesion enhancing system to be described hereinafter so that the distance between the edge approaching position and adhesion enhancing section can be set at a zero, in other words, the edge approaching position can be set on the leading part (the upper side in a carrying direction) of the adhesion enhancing section.

Figure 11:
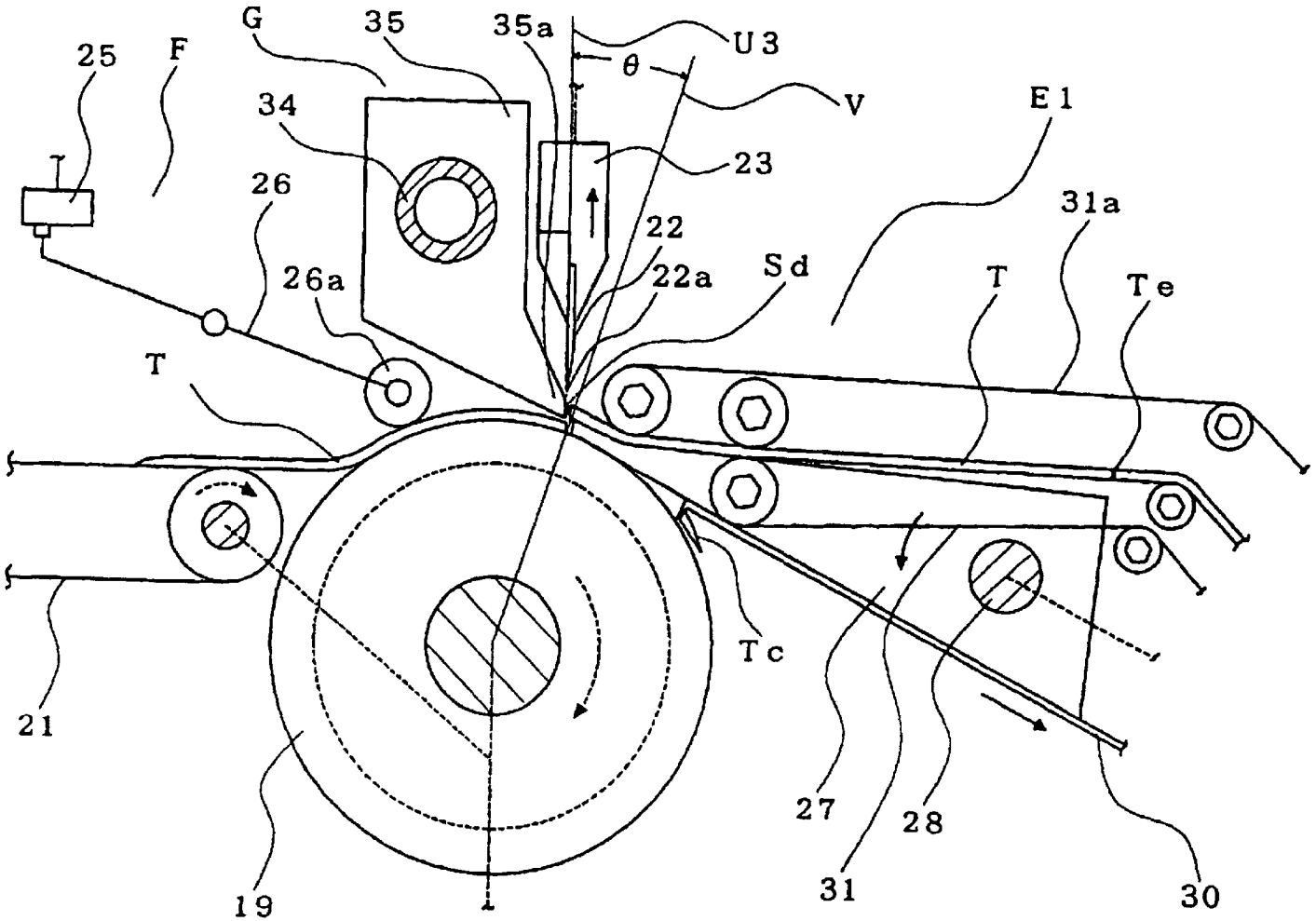
FIG. 11 shows a brief side view of the adhesive material supplying system for use with the joining apparatus as other embodiment.

The adhesive material supplying system is described in this paragraph. The adhesive material supplying system (B) shown in FIG. 1 is publicly known (Japanese patent publication No. S55-40401). However, as a type of the adhesive material supplying system compatible with the mechanical structure of the aforementioned veneer carrying system (E), the adhesive material supplying system (G) is widely known (Japanese patent No. 2887621), which comprises, as shown in FIG. 11, a pipe (34) for leading the adhesive agent, glue applying device (35) or the like in which a discharging hole (drawing omitted) of the adhesive agent (Sd) is provided on the tip (35a), discharges an appropriate amount of the adhesive agent (Sd) from the said hole while the back edge of the preceding veneer is trembling down to the farther side by the action of the control valve (drawing omitted) provided in the aforementioned pipe (34) or on the position of the tip (35a). As disclosed in the said publications, in the veneer carrying system (E1) as shown in FIG. 11, the edge approaching position as indicated by line (U3) which is equivalent to the cutting path of the blade edge (22a) of the cutting blade (22) is obliquely set by an appropriate angle (θ) from the upper side to the farther side in a carrying direction, and in a centripetal direction (V) of the anvil roller (19), then the reciprocating motion of the cutting blade (22) is set to stabilize the application of the adhesive agent (Sd) to the back edge surface of the preceding veneer (T). Also, the aforementioned glue applying device (35) may be tremblingly and movably provided so as to incorporate the pipe (34) in the center so that the tip (35a) incorporating a discharging hole for the adhesive agent (Sd) can be tremblingly reciprocated in a slight distance to the back edge surface of the preceding veneer (T) after discharging the adhesive agent (Sd).

Figure 12:
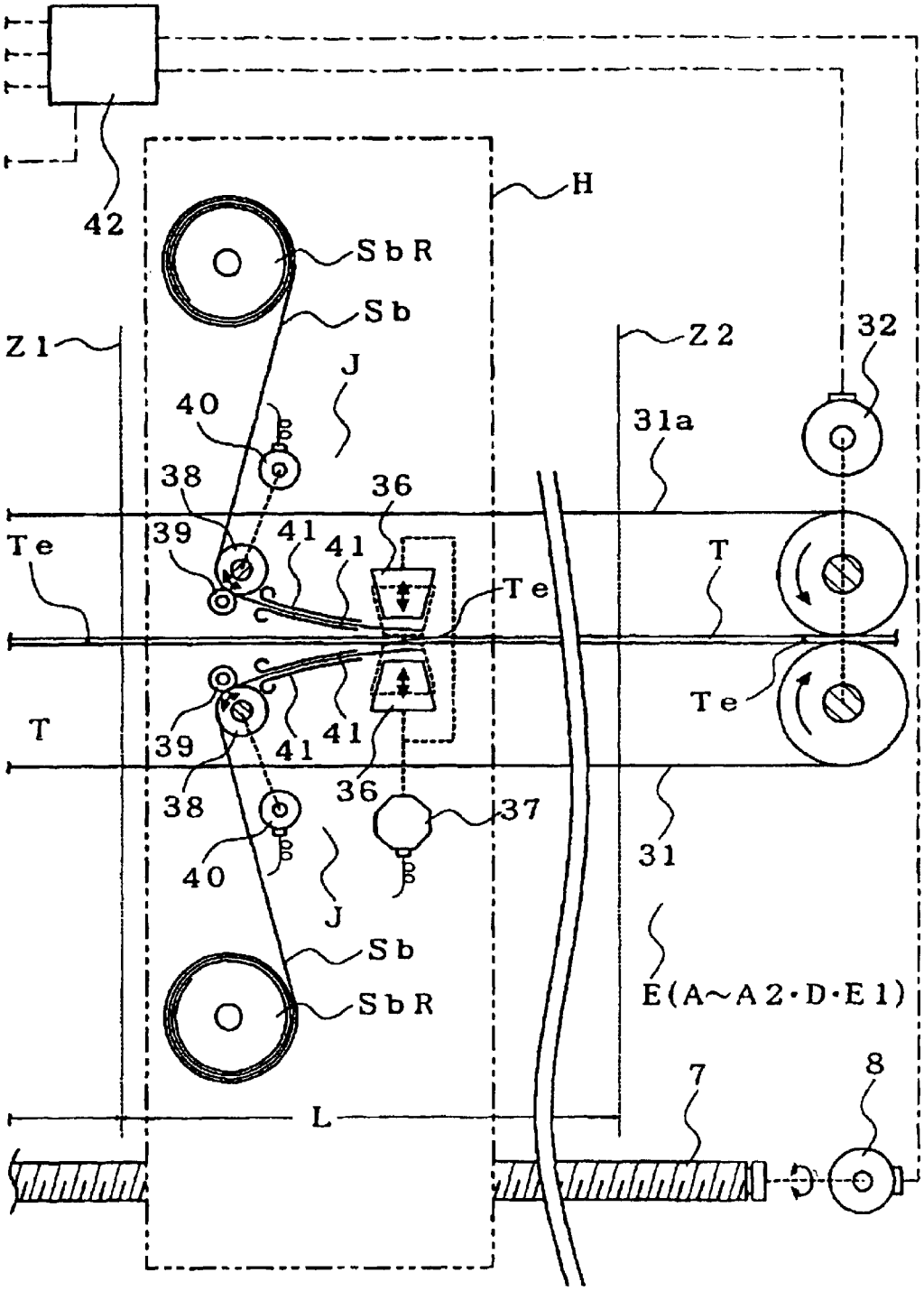
FIG. 12 shows a brief side view of the adhesive material supplying system for use with the joining apparatus as other embodiment.

On the other hand, each of the aforementioned adhesive material supplying systems has an applicable mechanism to previously apply the adhesive material before the unjoined edge reaches the adhesion enhancing section. However, it is possible to use other joining apparatus by directly combining the adhesion enhancing system to the adhesive material supplying system comprising pay-out type of the adhesive material supplying device which continuously pays out the adhesive material of the required length to a small limited area, including the aforementioned joining edges inside, on the top or bottom surface of each veneer (the top surface is preferably used because of the simplicity of the maintenance) responding to the unjoined edge reaching the adhesion enhancing section. The adhesive material supplying system comprising an adhesive material supplying device paying out the adhesive tape as shown in FIG. 12 can be used as one example of the adhesive material supplying system comprising such a pay-out type of the adhesive material supplying device. In other words, In FIG. 12 showing a brief side view of the other embodiment of the adhesive material supplying system, (36) comprising an adhesion enhancing function corresponding to the feature of the adhesive tape (Sb) supplied by the adhesive material supplying system (J) to be described hereinafter, is provided as indicated by full line and dot line so as to contact and separate synchronously to each veneer (T). When the adhesion enhancing system (H) shifts to the position where the unjoined edge reaches within the adhesion enhancing section divided by lines (Z1) and (Z2) provided on the carrying route of the veneer carrying system (E) (A to A2, D and E1) under control of the control system (42) to be described hereinafter, (36) contacts the veneer (T) (or contacts indirectly over the adhesive tape (Sb) if the adhesive tape (Sb) is used on the contacting spot) for only the period to activate the adhesive function of the adhesive tape (Sb), then supplies the adhesion enhancing action to the adhesive tape (Sb).

(38) is a tape feeding roller constituting part of the adhesive material supplying device of the adhesive material supplying system (J) provided against the tape-pressing roller (39). The tape feeding roller (38) pays out the adhesive tape (Sb) by the required length from the adhesive tape reel (SbR) to supply toward a small limited area including the unjoined edge on the required face (both top and bottom faces are required in FIG. 12) of each veneer (T) via a pair of tape guide (41) being vertically provided and constituting other part of the adhesive material supplying device before the adhesion enhancing system (H) shifts to the position where the unjoined edge reaches within the adhesion enhancing section as divided by lines (Z1) and (Z2) under control of the control system (42) to be described hereinafter. At the same time, the adhesive tape (Sb) is intermittently fed and cut via a rotation of an appropriate driving source (40) such as a servo motor or the like with a motion to slightly feed back the adhesive tape (Sb) while the adhesive tape (Sb) is being pressed against the veneer (T) by the adhesion enhancing component (36).

(42) is a control system comprising control functions of a cutting process device such as the intermittent conveyors (31), (31a) or the like constituting the veneer carrying system (E), of an adhesion enhancing device such as the adhesion enhancing system (H) or the like, and of the adhesive material supplying system (J). As well as the control system (33) of the joining apparatus shown in FIG. 9, the control system (42) halts the motion of the intermittent conveyors (31), (31a) or the like, activates the cutting blade, and controls the open-and-close classifier to alternatively open and close its gate every time the border line between the utilizable part and unnecessary part of the veneer reaches the position of the cutting blade according to the veneer detection signal of the veneer detection device in the veneer detection system, at the same time, always moves the adhesion enhancing system (H) to the position of the unjoined every time the unjoined edge reaches within the adhesion enhancing section as divided by lines (Z1) and (Z2), and controls the adhesion enhancing component (36) via a working component (37) at any point when the veneer (T) is carried and halted. Furthermore, the control system (42) activates the adhesive tape reel (SbR) to feed an adhesive tape (Sb) of the required length to supply toward the position of the small limited area including the unjoined edge via the tape guide (41) before (or preferably on time) the adhesion enhancing system (H) completes shifting to the required position, and controls the tape feed roller (38) to rotate forward and reverse via the driving source (40) in a direction as indicated by an arrow in the drawing while the adhesive tape (Sb) is pressed against the veneer (T) by the adhesion enhancing component (36). (The control circuit omitted in the drawing)

Figure 19:
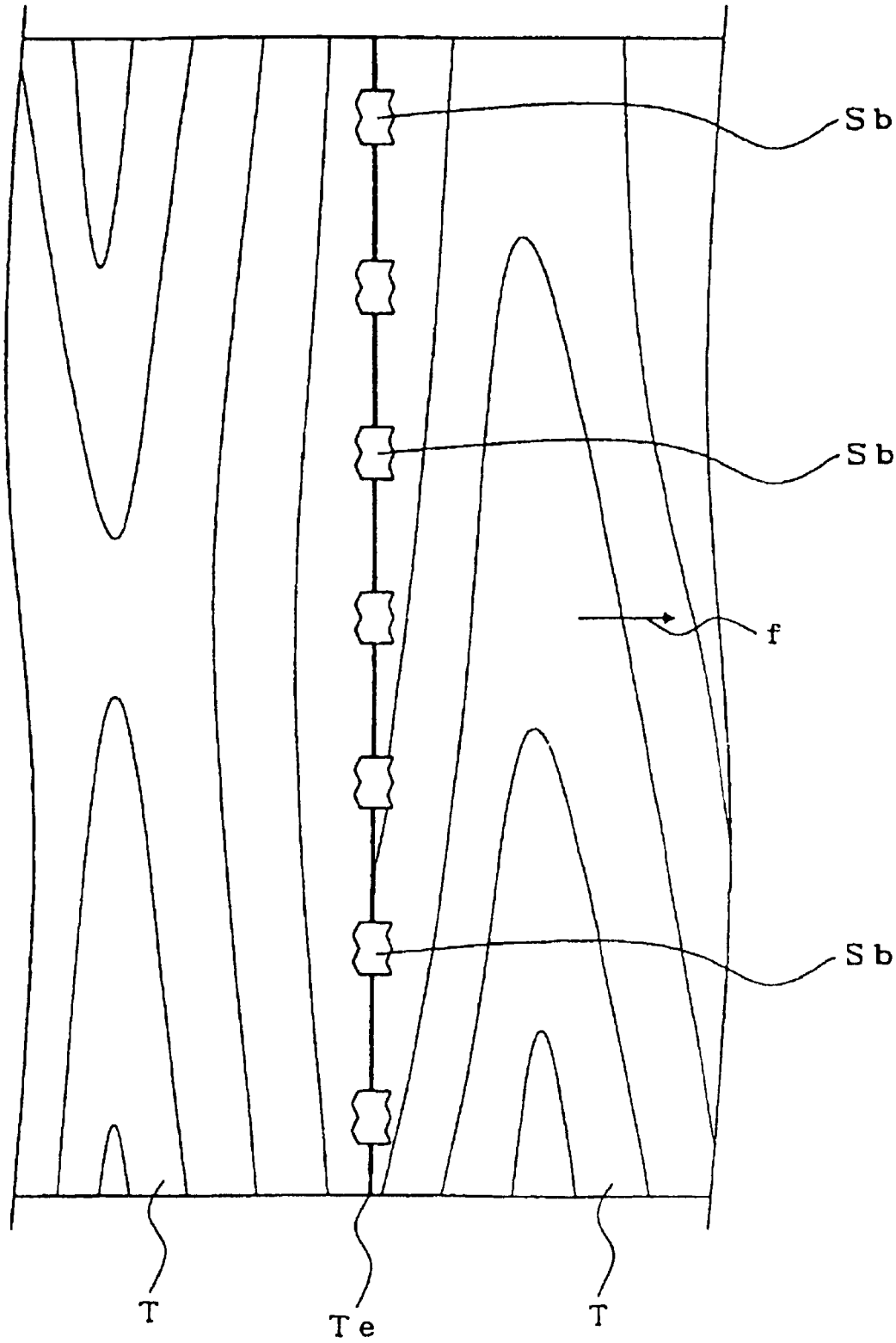
FIG. 19 RELATED ART
FIG. 19 shows a flat view to describe how to apply the adhesive material to the veneer.

By using an adhesive material supplying system (J) comprising above identified mechanism, the adhesive tape (Sb) can be intermittently fed, cut in a narrow shape, and applied to a small limited area including the joining edge on the required face (top and bottom faces are both required in the drawing) of each veneer (T). Also, in order to simplify the cutting of the adhesive tape, it is preferable to make the tip on the adhesive material supplying system contacting the veneer of the adhesion enhancing component, convexoconcave or the like, for example, as the cutting shape of the adhesive tape (Sb) in FIG. 19.

Figure 18:
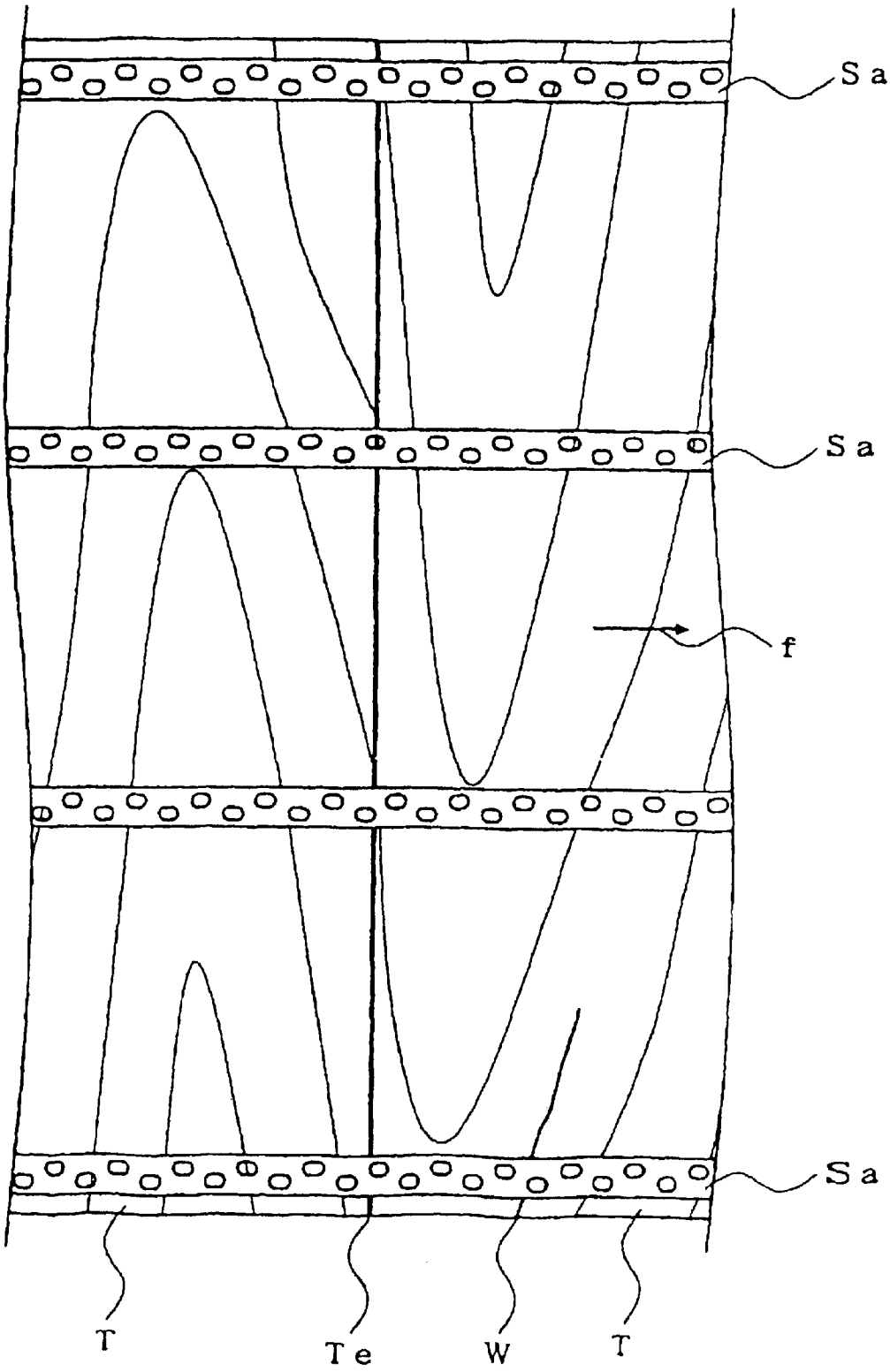
FIG. 18 RELATED ART
FIG. 18 shows a flat view to describe how to apply the adhesive material to the veneer.

As a result of the examination to pressurize and heat an adhesive tape coated with hydrophilic thermosetting adhesive agent processed by heated adhesion enhancing component, water soaked in a non-dry veneer dissolves the hydrophilic thermosetting adhesive agent as the adhesive tape is pressurized, and then the said dissolved hydrophilic thermosetting adhesive agent is hardened by heat within an effective time, thus, such a non-dry veneer which was still in the experimental stage has turned to practical use. Also, a rewet type adhesive tape widely known as a gummed tape is inexpensive and seems a very applicable adhesive material, however, such adhesive materials are not suitable for the joining apparatus in this invention which requires to cut such adhesive tape into small pieces in an irregular time, since it takes a certain period of waiting time until the adhesiveness becomes effective, and even if it is humidified, it becomes dry and the adhesiveness decreases after a certain period of time. Although there is almost no actual experience to use such adhesive materials in other mode than a mode to apply continuously as indicated in FIG. 18, the inventor in this invention found that if the dry veneer containing approx. 12% or less of water is used as usual, re-wet type adhesive tape can be applied and fixed on the single piece without humidification by pressuring via the adhesion enhancing component highly heated up between 100 and 210 (preferably between 120 and 210). Therefore it is confirmed that the joining cost can be reduced.

Figure 13:
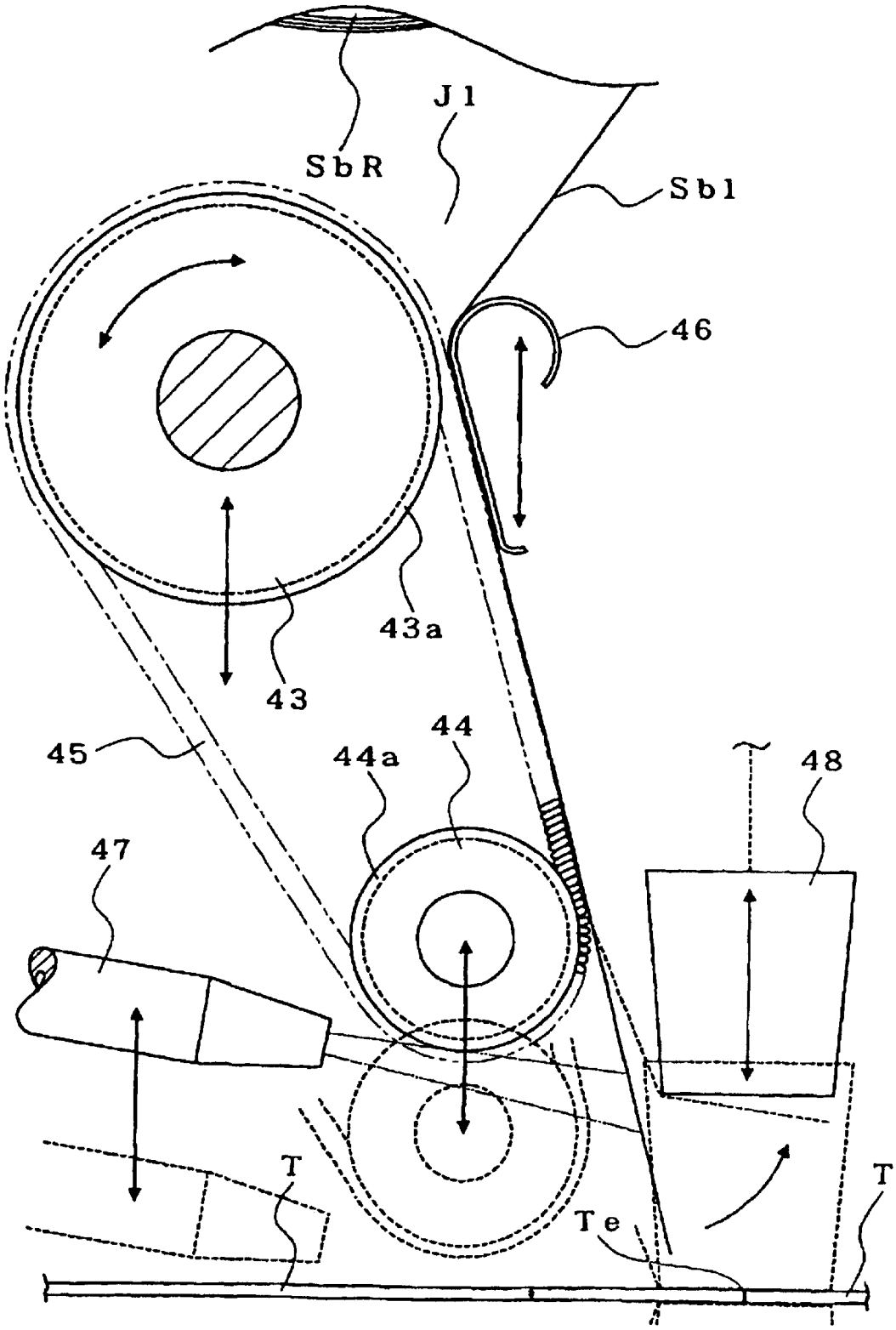
FIG. 13 shows a brief side view of the adhesive material supplying system for use with the joining apparatus as other embodiment.

On the other hand, the aforementioned feeding type of the adhesive material supplying system using the tape guide is suitable for the use with an adhesive tape such as adhesive tape coated with thermosetting adhesive agent, hydrophilic thermosetting adhesive agent, thermoplastic adhesive agent, rewet adhesive agent or the like, or coated with a regular combination or random combination of required adhesive agents which indicates low adhesiveness when passing through the tape guide (however, in case of the rewet adhesive tape, it is not in humidified condition), however, as for the feeding type of the adhesive material supplying system suitable for the use with the adhesive tape such as a pressure-sensitive tape or the like which comprises an adhesiveness in the aforementioned period of time, for example as shown in FIG. 13, feeding type of the adhesive material supplying system can be suggested. In other words, in FIG. 13 showing a brief side view of the other embodiment of the adhesive material supplying system, (43) is a tape feeding roller comprising a plurality of grove (43a) which guide a plurality of non-end coil spring (45) constituting part of the adhesive material supplying device in the adhesive material supplying system (J1), and reciprocates together with an opposite tape pressing coil spring (46) adhesion enhancing component (48) constituting part of the adhesion enhancing system or the like in a direction as indicated by an arrow, and also feeds the pressure-sensitive tape (Sb1) of the required length from the adhesive tape reel (SbR) before (or preferably on the time when) the adhesion enhancing system shifts to the required position under control of the control system (drawing omitted) which is based on the control system as described in FIG. 12, and rotates forward and reverse with a motion to slightly feed back the pressure sensitive tape (Sb1) via an appropriate driving source (drawing omitted) such as a servo motor or the like in a direction as indicated by an arrow while the pressure-sensitive tape (Sb1) is pressed against the veneer (T) by the adhesion enhancing component (48).

(44) is a free rotating roller comprising a plurality of groove (44a) guiding a coil spring (45), and provided together with the aforementioned tape feeding roller (43) or the like so as to reciprocate in a direction as indicated by an arrow and provide the said coil spring with an appropriate tensile force.

(47) is a air spray nozzle constituting other part of the adhesive material supplying device in the adhesive material supplying system (J1) and reciprocates together with the aforementioned tape feeding roller (43) or the like in a direction as indicated by an arrow, starts ejecting a compressed air after the pressure sensitive tape (Sb1) of the required length is discharged under control of the control system not described in the drawing, and activates the control valve (drawing omitted) to finish ejecting the compressed air when the pressure-sensitive tape (Sb1) is pressed against the single piece (T) by the adhesion enhancing component (48), and bend the leading end of the pressure-sensitive tape (Sb1) to the undersurface of the adhesion enhancing component (48).

In the adhesive material supplying system (J1) comprising such a structure, the leading end of the pressure sensitive tape (Sb1) temporarily adhered to a plurality of coil spring (45), which is discharged with a rotation of the tape feeding roller (43), on the position of the tape pressing spring (46) is stripped off one after another form the coil spring (45) as the coil spring (45) is bent and intervals of circumferential coil is enlarged on the position of free rotating roller (44), and at the first time, as indicated by full line, the leading end of the pressure sensitive tape (Sb1) is discharged in a direction of brief tangent line, however, is bent to the undersurface of the adhesion enhancing component (48) by the ejection of the compressed air through the air spray nozzle (47) as indicated by a dot line after the required length has been discharged. Therefore, the pressure sensitive tape (Sb1) can be stably supplied regardless of the adhesiveness, and as well as the aforementioned adhesive material supplying system (J), can be cut into a narrow shape and applied to a small limited area, including the joining edge, on the top surface of each veneer (T) (the adhesive material supplying system (J) can be provided accordingly on the top and/or bottom faces)

Figure 14:
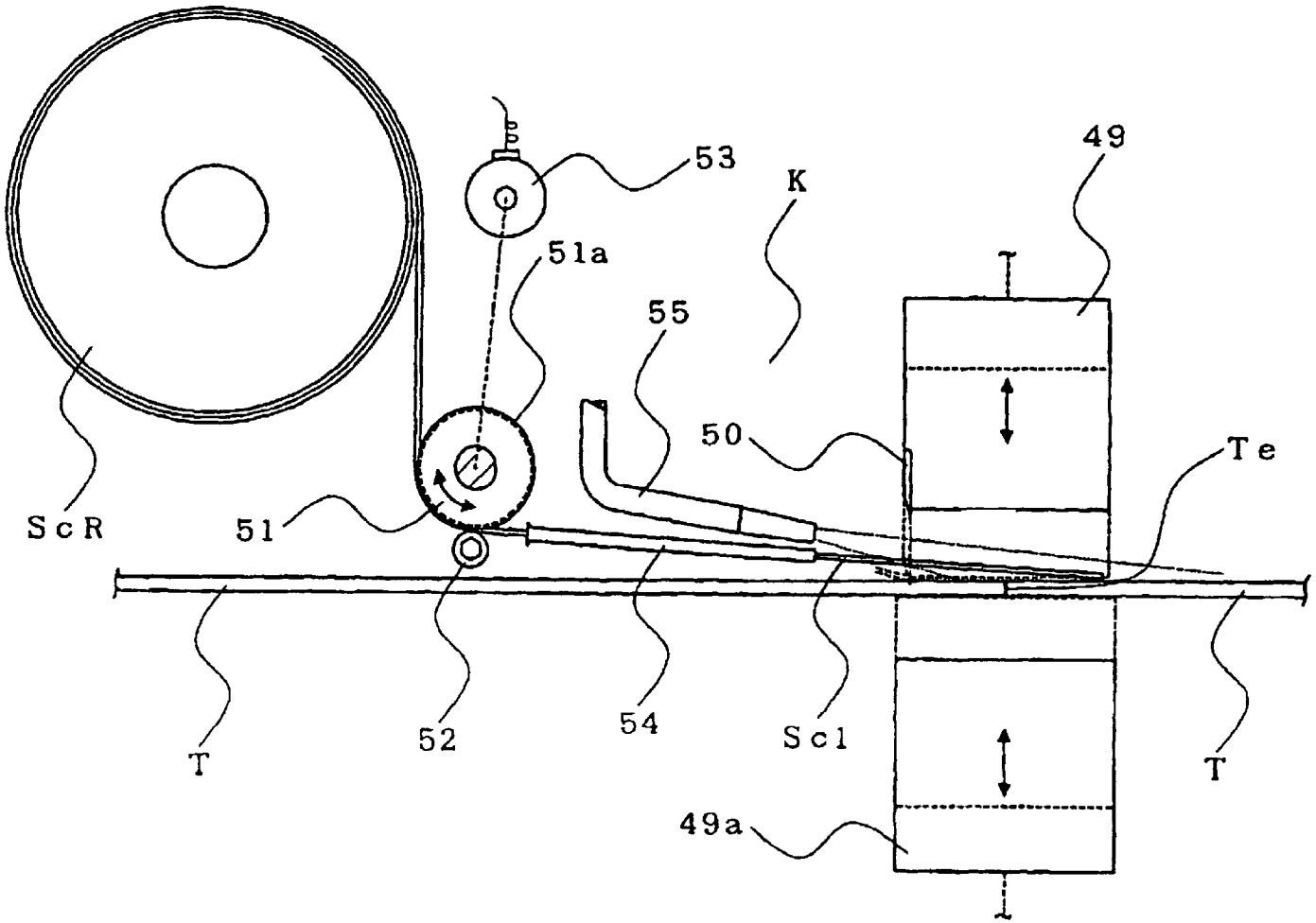
FIG. 14 shows a brief side view of the adhesive material supplying system for use with the joining apparatus as other embodiment.

On the other hand, as an example of the adhesive material supplying system for use with the adhesive material such as an adhesive thread coated with and/or soaked in a thermoplastic adhesive agent, adhesive thread feeding type of adhesive material supplying system is suggested. In FIG. 14 showing a brief side view of other embodiment in regard to the adhesive material supplying system, (49) is an adhesion enhancing system which constitutes part of the adhesion enhancing system comprising cooling function applicable to the feature of the adhesive thread (Sc1) supplied by the adhesive material supplying system to be described hereinafter. As indicated by full line and dot line, the said adhesion enhancing system (49) is equipped to contact and separate from the veneer (T) in conjunction with a motion of the supporting component (49a) located on the symmetrical position of the said adhesion enhancing system (49), and contacts the veneer (T) (or contacts indirectly over the adhesive thread (Sc1) if used) only for the period sufficient to activate the adhesive function to the adhesive thread (Sc1) with a motion of the working component (drawing omitted) when the adhesion enhancing system shifts to the required position under control of the control system (drawing omitted) comprising a structure based on the control system described in FIG. 12.

(50) is a thread cutting blade provided together with the adhesion enhancing component (49), and cuts the adhesive thread (Sc1) when the adhesion enhancing component (49) contacts the veneer (T). In order to maintain the straightness (linearity) of the adhesive thread coated with and/or soaked in the thermoplastic adhesive agent when heated and melted, it is preferable to use a flame-resistant plastic thread composed of glass fiber, soft metal or the like as a base material.

(51) is a adhesive thread feeding roller which constitutes part of the adhesive material supplying device in the adhesive material supplying system (K), comprising a groove (51a) to guide the adhesive thread (Sc1) coated with and/or soaked in the thermoplastic adhesive agent, and facing the adhesive thread pressing roller (52). The adhesive thread feeding roller (51) discharges the adhesive thread (Sc1) of the required length from the adhesive thread reel (ScR) before (or preferably on) the time when the adhesion enhancing system shifts to the required position under control of the control system not shown in the figure, supplies the said adhesive thread (Sc1) to a small limited area including the unjoined edge via an adhesive thread guide (54), and then rotates forward and reverse in a direction as indicated by an arrow via an appropriate driving source (53) such as a servo motor or the like with a motion to slightly feed back the adhesive thread (Sc1) while the adhesive thread (Sc1) is being pressed against the veneer (T) by the adhesion enhancing component (49).

(55) is a hot air spray nozzle which operates to eject a hot air for the required period of time via a control valve (not shown in the figure) when the aforementioned adhesive thread (Sc1) is supplied to the position focusing a small limited area including the unjoined edge on the required surface (top surface is required in the figure) of each veneer, and melts the thermoplastic adhesive agent coating and/or soaking the adhesive thread (Sc1). Although the figure is omitted, according to need, it is possible to make the aforementioned hot air spray nozzle work all the time, provide a compressed air spray nozzle on one side of the hot air passage, accordingly control the aforementioned compressed air spray nozzle to open and close via the control valve so that the hot air can be applied to the aforementioned adhesive thread only during times required, thus the hot air spraying direction can be controlled by the compressed air.

The adhesive material supplying system (K) comprising such structure can also intermittently lead out the adhesive thread (Sc1) every time the adhesion enhancing system moves to the required position, in almost the same manner as that of the aforementioned adhesive material supplying systems (J) and (J1), and cut the adhesive thread (Sc1) into short lines. If necessary the same type of the adhesive material cutting blade can be provided on the adhesion enhancing component as described in FIGS. 12 and 13. And when the adhesive thread coated with and/or soaked in the thermosetting adhesive agent is used, the aforementioned hot air spray nozzle can be omitted, and according to need, an adhesive material supplying system comprising a humidifier which supplies an appropriate amount of vapor to the leading part of the adhesive thread can be alternatively used and at the same time it is sufficient to provide the aforementioned adhesion enhancing system with a heating function instead of a cooling function.

Next, the control system of the adhesion enhancing device is described here. As clearly described in the embodiments in FIGS. 1, 8, 9, 12 and 15 which is to be described hereinafter, the control system of the adhesion enhancing device should only comprise a joining edge detection device in an appropriate position from the vicinity of the edge approaching position on a carrying route to the adhesion enhancing section and a mechanism to shift the adhesion enhancing system to the position of the unjoined edge located on the farthest side of the conveyor in a carrying direction and to control the adhesion enhancing component to activate. If necessary, as shown in FIGS. 8, 9 and 12, the said control system of the adhesion enhancing device can be equipped together with a control system to control the functions of other components and systems. Each control system of the adhesion enhancing device shown in FIGS. 1, 8, 9 (and 12) comprises a mechanism which comprises a detection system to detect the joining edge before the joining edge of the veneer comes close to another joining edge nearly in front of the edge approaching position. However, another detection system in FIG. 15 to be described hereinafter can detect the joining edge before it reaches the adhesion enhancing section even after the joining edge of the veneer comes close to another joining edge.

Figure 15:
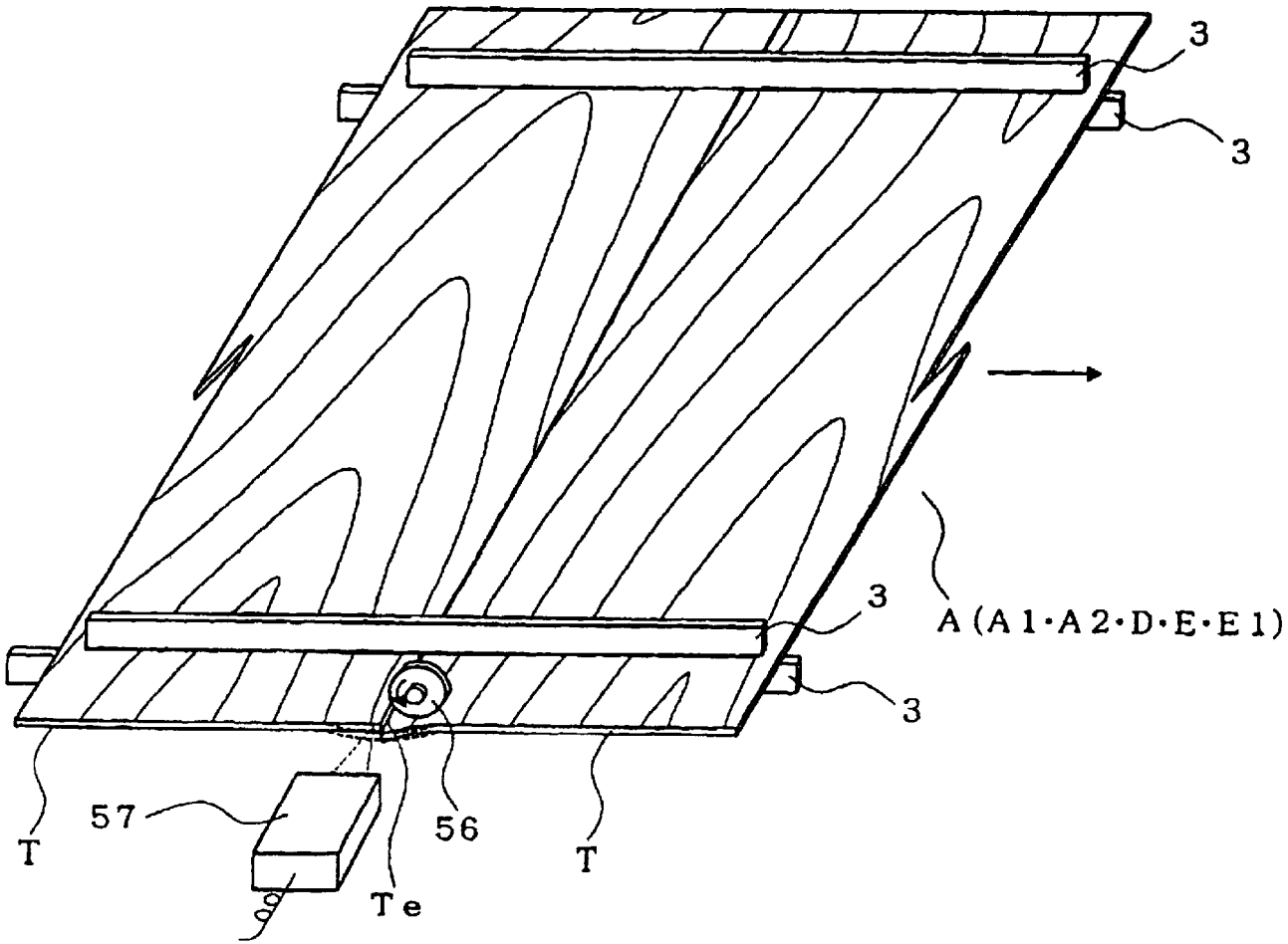
FIG. 15 shows a brief oblique perspective view of the detection system of the joining edges for use with the joining apparatus as other embodiment.

In other words, in FIG. 15, which briefly shows an oblique perspective view of the other embodiment in regard to the joining-edge detection, system, (56) is a veneer pressing roller which constitutes part of the joining-edge detection system. Circumferential part of the veneer pressing roller (56) freely moves to the position to shut out the carrying route composed of the veneer carrying system (A) (A1, A2, D, E and E1), and press the edge in a fibrous direction of the veneer (T) so that the edge of the veneer (T) passes through the position deviated from the original carrying route.

(57) is an end face detection device provided on one side in a carrying route located on the slightly upper side in a carrying direction of the aforementioned veneer pressing roller (56), which comprises a reflective light-sensitive tube constituting other part of the joining edge detection device. The said end face detection device (57) sends out signals to the control system (drawing omitted) of the adhesion enhancing device only when the end face in a fibrous direction of the veneer (T) passes the original position of the carrying route.

In the aforementioned joining edge detection system, when no joining edge exists on the veneer being carried, as indicated by full line, the veneer pressing roller (56) presses the edge of the veneer (T) in a fibrous direction, and passes the position deviated from the original carrying route, therefore, the end face detection device (57) does not send out the signals. To the contrary, when the joining edge exists on the veneer, the front edge of the succeeding veneer (T) passes the original position of the carrying route as indicated by full line, even though the back edge of the preceding veneer (T) is pressed as indicated by full line. Therefore, the said end face detection device (57) can send out the edge detection signals and alternatively used in place of each detection system of the aforementioned embodiments to detect the joining edge in advance.

If the aforementioned veneer pressing roller is provided on the position of clearance between the preceding and succeeding veneers (drawing omitted), edge detection devices composed of a pair of photoflood and photo acceptance light-sensitive tube can be oppositely provided to be aligned diagonally upward an downward in order to detect the joining edge as well. Moreover, according to need, those two different detection systems can be jointly provided, i.e. the latter (embodiment in FIG. 15) can be used only for the control of the adhesion enhancing device and the former (each embodiment of the aforementioned embodiments) can be used only for the control of the rest of devices. In order to avoid the possibility that the latter detection system accidentally detects the cracks which may be exist inside the veneer, it is sufficient to check the synchronicity of the detection signals after providing detection systems on the both sides on the carrying route. Also, it is possible to use the former detection system provided on one side or both sides in order to detect the cracks, and to activate the control system to operate an appropriate adhesive material supplying system ad adhesion enhancing system so that at least the edge of the crack can be joined together.

Also, it is possible to use another detection system (drawing omitted) which previously applies or sprays pigment, ink, or the like to the joining edge or near the joint edge of the veneer, on or around the edge approaching position to identify the mark as a joining edge, comprises an edge detection device composed of an image sensor or the like on an appropriate position on the farther side in a carrying direction, detects the aforementioned mark, and then sends out the edge detection signals. In other words, the detection system requires only a joining edge detection function.

As mentioned above, in an actual operation, there is almost no possibility that the adhesion enhancing component deviates from the position of the adhesion enhancing section. However, it is preferable to install an emergency control program in one of the control systems, to temporarily stop the operation of the single piece carrying system until the adhesion enhancing component completes the supply of the adhesion enhancing action if the adhesion enhancing component shifts to the farthest position (as indicated by line (Z2)) in a carrying direction in the adhesion enhancing section.

Figure 16:
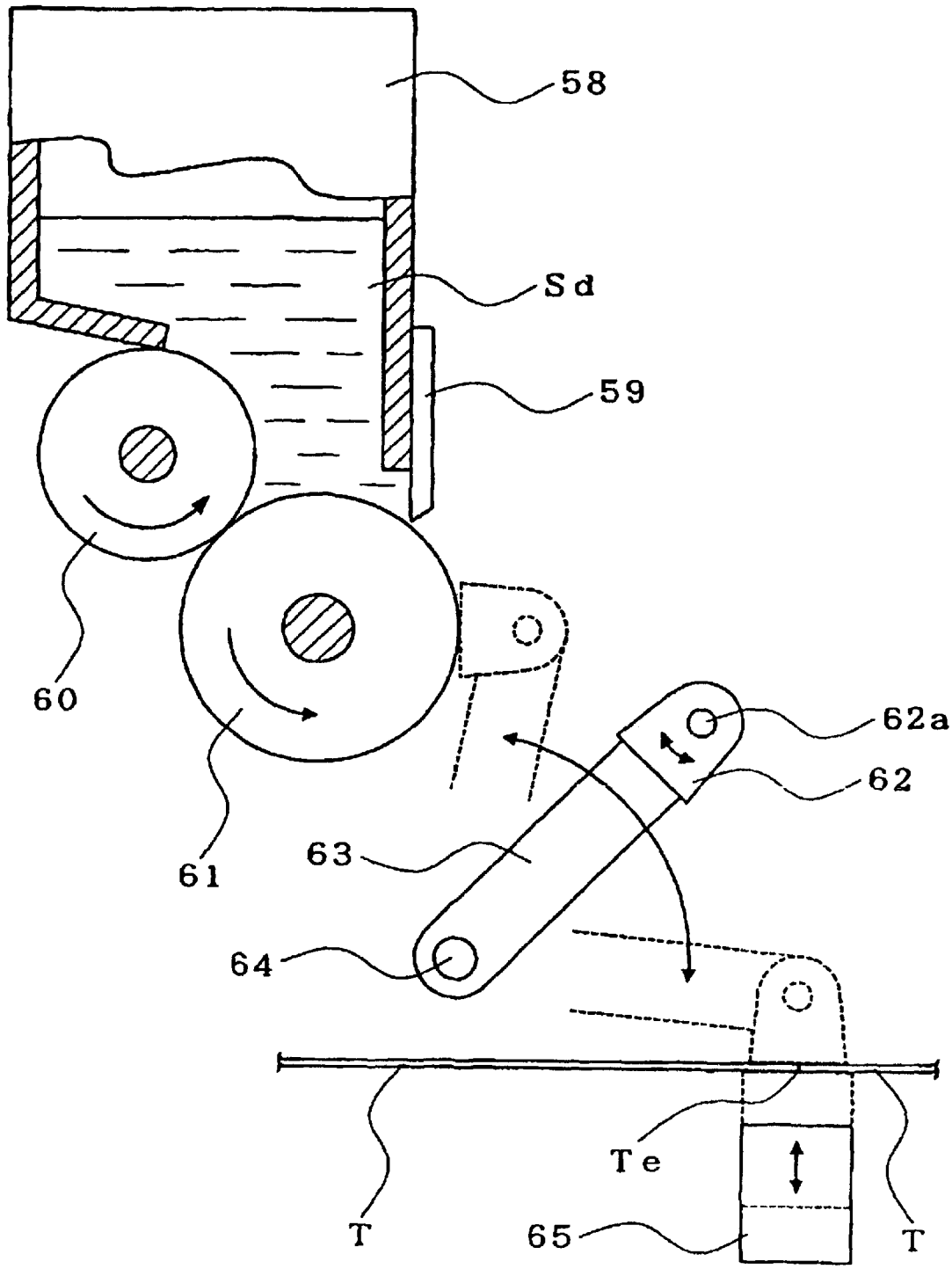
FIG. 16 shows a brief side view of the adhesion enhancing system for use with the joining apparatus as other embodiment.
Figure 17:
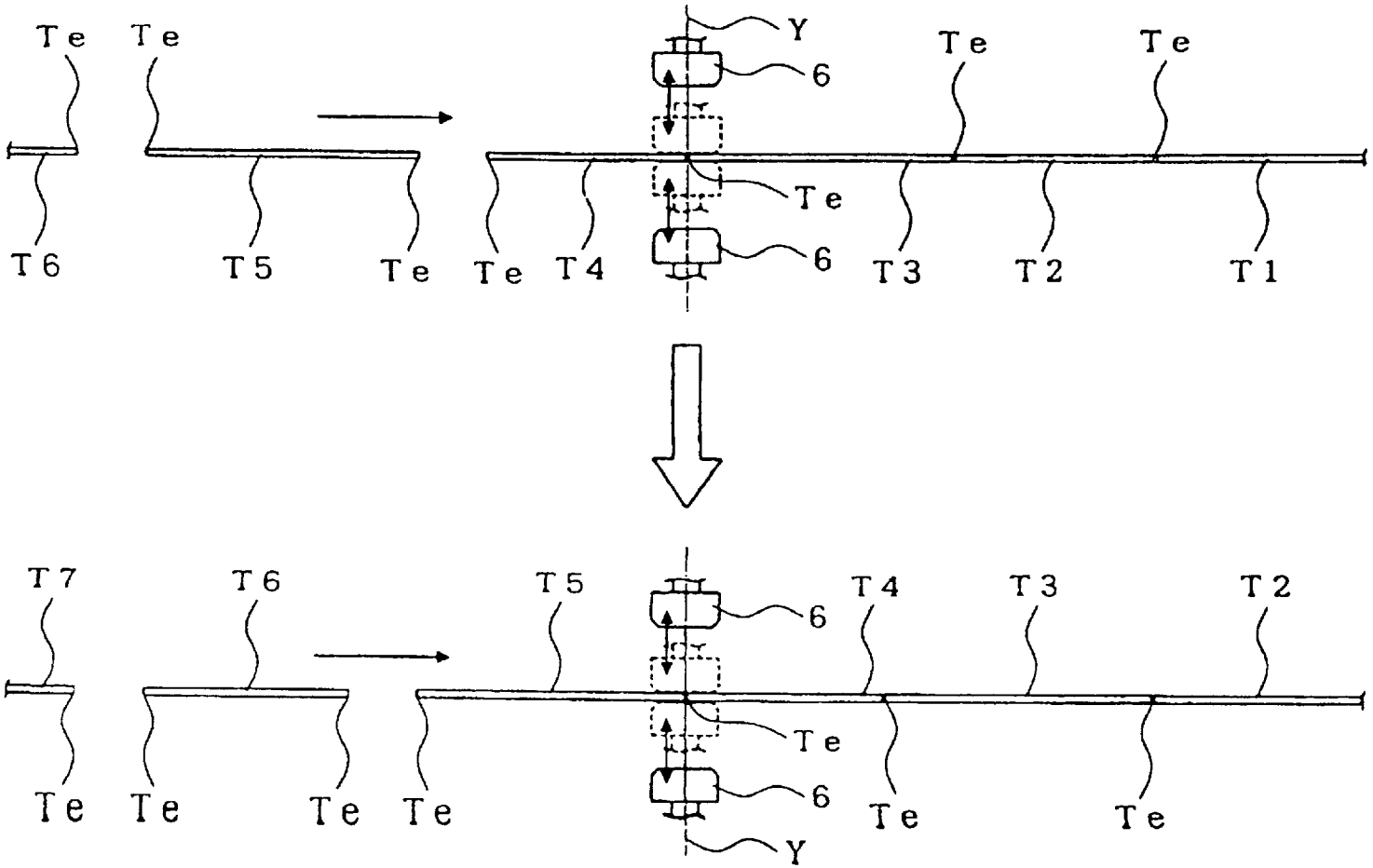
FIG. 17 RELATED ART
FIG. 17 shows a process to describe the conventional joining operation of the veneer.

The adhesion enhancing system is described in this paragraph. Each of the aforementioned embodiments in regard to the adhesion enhancing system has a structure to activate the adhesion enhancing component in a vertical direction against a face of the veneer. However, the system is not always operated only in a vertical direction against the face of the veneer. Although the drawing is omitted it is possible to provide the system with a structure to operate in an oblique direction against the face of the veneer, or in a various direction including a direction as indicated in FIG. 16. In other words, in FIG. 16 which briefly shows a side view of the other embodiment in regard to the adhesion enhancing system, (58) is a glue tank which constitutes part of the adhesive material supplying system together with a divider plate (59), reverse roller (60), applying roller (61) or the like to be described hereinafter, and contains an appropriate amount of the adhesive agent (Sd).

(59) is a divider plate provided on the aforementioned glue tank (58), and prevents the adhesive agent (Sd) spilling from the glue tank (58) and receives the remainder of the adhesive agent (Sd) applied on the circumference of the applying roller (61) to be described hereinafter.

(61) is an applying roller provided on the aforementioned glue tank (58), and rotates in a direction as indicated by an arrow in the figure via an appropriate driving source (drawing omitted) composed of an electric motor with a reducer (or preferably via a slip accepting component such as a torque limiter or the like), and rotates in the opposite direction, and then retains an appropriate thickness of the adhesive agent (Sd) on the circumference under control if the reverse roller (60) provided on the glue tank (58) as well. And if necessary, a groove in an appropriate shape can be provided on the circumference of the said applying roller (61).

(62) is an adhesion enhancing component which constitutes part of the adhesion enhancing system and also functions as an adhesive agent applying tool which constitutes other part of the adhesive material supplying system. The said adhesion enhancing component (62) is pivotally and movably provided via a supporting point pin (62a) on a rotatable arm (63) which is pivotally and movably supported by a supporting axis (64), and is normally located in the waiting position as indicated by full line under control of the control system (not shown in the drawing). Every time the adhesion enhancing system moves to the required position, the adhesion enhancing component (62) rotates to the position to contact the circumference of the aforementioned applying roller (61), then to the small and limited area on the required face (top surface is required in the drawing) of each veneer (T) including the unjoined edge (Te) inside, and finally to the original waiting position so that the adhesive agent (Sd) which has been transferred from the circumference of the applying roller (61) can be retransferred to the small and limited area on the top surface of each veneer (T) including the unjoined edge inside, and at the same time, the adhesion enhancing action is supplied to the said retransferred adhesive agent (Sd).

(65) is a supporting component which constitutes other part of the adhesion enhancing system, and provided to work in an arrow corresponding to the movement from the mid to the end of the aforementioned adhesion enhancing component (62) by control of the control system (not described in the figure) and with a motion of the working component. The supporting component (65) assists the adhesion enhancing component (62) to supply the adhesion enhancing action.

For instance, the adhesion enhancing system comprising the aforementioned structure makes it possible to retransfer the adhesive agent (Sd) which has already been transferred from the circumference of the applying roller (61) to a small limited area, including the joining edge (Te), on the required face (top face is required in the drawing) of each veneer (T) via a motion of the adhesion enhancing component (62), and also makes it possible to activate the adhesive agent (Sd) having been retransferred by supplying the adhesion enhancing action for joining the edge (Te). Also, it is not compulsory that a working direction of the adhesion enhancing component (62) should be vertical against the face of the veneer (T).

Also, the adhesion enhancing component comprises an adhesion enhancing function corresponding to a feature of the adhesive material supplied by the adhesive material supplying system. However, it is not always necessary to use an adhesion enhancing component which directly comprises a source of the adhesion enhancing function, i.e. a heating equipment such as a heater, high-frequency transmitter, or the like, or a cooling equipment such as a cooler, cold air blower, or the like. In other words, it is possible to use a mechanism (not shown in the drawing) comprising a source of the required adhesion enhancing function in the vicinity of the waiting position of the adhesion enhancing component so that the waiting adhesion enhancing component can obtain an adhesion enhancing function indirectly from an outside source.

Other usages are described here. The joining method of veneers and joining apparatus in this invention can be applied to not only a joining process of the veneer with irregular width in a joining direction but a joining process of the veneer with a specific width or integral multiple width. In other words, this invention can be also applied to the joining process for the veneer or the like which is cut into a piece with a specific width or integral multiple width immediately before the joining process by the veneer carrying system or the like which comprises, for instance, the irregularly shaped ends cutting and removing mechanism as indicated in FIG. 9.

As clearly described in the above detail description, by using the joining method of veneers and joining apparatus for the said joining method, the joining process can be enhanced more efficiently than the conventional method and apparatus regardless of the width of the processed veneers. At the same time, the joining process can be executed in a better condition than before by using adhesive material such as an adhesive agent comprising an appropriate performance in consideration of the joining strength as well as the immediate effect in regard to the productivity which may be too much emphasized. Therefore, this invention will produce a profound effect on the veneer processing.

What is claimed is:

1. A method of joining veneers, in which a number of veneers to be joined are sequentially carried with intervals therebetween in a perpendicular direction to joining edges of the veneers such that said veneers are fed to pass a predetermined edge approaching position, each veneer having an upstream end edge and a downstream end edge, said veneers including a given veneer and preceding veneers on the downstream side of said given veneer, said method including the steps of:

halting said feed of the veneers the moment when the upstream end edge of said given veneer reaches said predetermined edge approaching position, said veneers further including a succeeding veneer on the upstream of said predetermined edge approaching position;

resuming the feed of said veneers when the downstream end edge of said succeeding veneer reaches said predetermined edge approaching position to abut against the upstream end edge of said given veneer;

halting the feed of said veneers when the upstream end edge of said succeeding veneer reaches said predetermined edge approaching position;

repeating the preceding steps whenever a further succeeding veneer is fed from the upstream side of said edge approaching position such that a group of such veneers having joining edges of adjoining veneers kept in close abutment against each other are subjected to an alternate halt and resumption of the feed;

supplying an appropriate amount of adhesive material to a limited area between the joining edges of said adjoining veneers or on part of at least either one of upper and lower sides of the respective veneers [at an appropriate period from the time when any one of said veneers starts to be carried from upstream of said predetermined edge approaching position to the time when the respective adjoining veneers are brought into the close abutment]; and applying an adhesion enhancing action to said adhesive material on each member of the group of veneers by adhesion enhancing means, wherein at least said step of applying the adhesion enhancing action is performed in an adhesion enhancing zone having a predetermined length and established on the downstream side of said edge approaching position, said adhesion enhancing means is moved to a position due above said joining edges of the adjoining veneers kept in close abutment against each other to come into synchronization with the feed and the halt thereof of said group of veneers to keep a positional relationship corresponding to said adhesive material for a predetermined period whether said group of veneers are being in motion or at a halt, said adhesion enhancing action is performed first on said joining edges of the adjoining veneers kept in close abutment against each other and thereafter, by moving said adhesion enhancing means in an upstream direction to work on next upstream ones sequentially, whereby said adhesion enhancing action is capable of being performed both while said veneers are being fed and the feed thereof is halted, wherein the veneers to be joined have different dimensions.

2. A method of joining veneers as set forth in claim 1, wherein said supply of the adhesive material is performed on the upstream of the edge approaching position.

3. A method of joining veneers as set forth in claim 1, wherein said supply of the adhesive material is performed after the joining edge of adjoining veneers are brought into a close abutment with each other.

4. A method of joining veneers as set forth in claim 3, wherein said supply of the adhesive material and said adhesion enhancing action are performed simultaneously.

5. A veneer joining apparatus, comprising:

a veneer carrying-in means (1, 1a) sequentially carrying a number of veneers to be joined in a direction perpendicular to the joining edges (Te) at intervals to an edge approaching position (U, U1);

a veneer carrying-out means (3, 15) to discharge said veneers from said edge approaching position;

a distance measuring member (2a) to measure a feed distance of a veneer to be fed from said veneer carrying-in means to said veneer carrying-out means;

an edge detection device (9) to detect that either of upstream and downstream joining edges of a veneer has reached said edge approaching position (U, U1);

an adhesive material supply member (4, 17) adapted to supply an adhesive material to at least one of said upstream and downstream joining edges of the veneer in an appropriate amount and intensively on either of the upstream and downstream sides of said edge approaching position (U, U1);

adhesion enhancing means (C, C1) adapted to reciprocate within a limited range downstream of said edge approaching position in synchronization with said carrying-out means to allow said veneer to run and halt for adhesion enhancing action and out of synchronization with said carrying-out means to allow said veneer to run and halt before or after said adhesion enhancing action; and a controller (10,18) adapted to operate in response to signals from said distance measuring member (2a) and said edge detection device (9);

in which the upstream joining edge of a veneer being carried into said carrying-out means reaches said edge approaching position to be detected by said edge detection device (9) to issue a first signal such that said carrying-out means allows said veneer to be halted in response to said first signal and then, the downstream joining edge of a succeeding veneer being carried in by said carrying-in means (1, 1a) reaches said edge approaching position (U) to be detected by said edge detection device (9) to issue a second signal such that said carrying-out means allows the veneer and the succeeding veneer to run such that a group of veneers downstream of said edge approaching position are maintained in a close abutment with one another every time said upstream and downstream joining edges of the veneers are detected by said edge detection device (9);

said edge detection device being adapted to detect either one of the upstream and downstream joining edges of the veneers to issue the signals to cause said adhesive material supplying member (4, 17) to supply the adhesive material onto said either one of the upstream and downstream joining edges of a single veneer on the upstream side of said edge approaching position (U, U1) and on the downstream side of said edge approaching position (U, U1) to cause said adhesive material supplying member (4, 17) to supply the adhesive material onto an area between the joining edges of adjoining veneers or part of a limited area on at least either one of upper and lower sides of the respective veneers;

said adhesion enhancing means (C, C1) being moved, when said adhesive materials are determined to have sequentially reached said limited range by said signals from said edge detection device (9) and said distance measuring member (2a), to a position corresponding to said adhesive materials in synchronization of the running and halting operation of said carrying-out conveyor and operated to perform the adhesion enhancing action when said veneers are in motion;

said adhesion enhancing means (C, C1) being moved to a position corresponding to said adhesive materials in synchronization of the halting and running operation of said carrying-out conveyor to perform the adhesion enhancing action when said carrying-out conveyor is at a halt such that said adhesion enhancing action at said corresponding position is maintained for a predetermined period, said adhesion enhancing action being performed on the adhesive material at the most downstream position.

6. A veneer joining apparatus according to claim 5, wherein said adhesive material supply member (4, 17) and said adhesion enhancing means (C, C1) are adapted to integrally run in a veneer feeding direction and halt, said controller (10, 18) operating such that the carrying-out means is run until the upstream joining edge of a carried-out veneer is detected to have reached said edge approaching position (U, U1) by said edge detection device (9) to issue a first detection signal in response to which said carrying-out means allows said carried-out veneer to be halted;

the downstream edge of a carried-in veneer carried in by said carrying-in conveyor being detected to have reached said edge approaching position (U, U1) to issue a second detection signal in response to which said carrying-out means allows said carried-out veneer to run again such that veneers on downstream side of the edge approaching position are grouped with adjoining veneers maintained in close abutment with one another, the joining edges of said adjoining veneers being detected to sequentially reach said limited range on the basis of said first and second detection signals from said edge detection device (9) and the feed distance obtained by said distance measuring member (2a);

said adhesive material supply member (4, 17) and said adhesion enhancing means being moved to a position corresponding to the adjoining edges of the veneers and operated to perform the adhesive material supply and the adhesion enhancing action simultaneously onto a limited range of either of the upper and lower side of each veneer in synchronization with the carrying-out means while said carrying-out means allows the veneers to be in motion;

said adhesive material supply member (4, 17) and said adhesion enhancing means (C, C1) stopping said adhesion supply action and said adhesion enhancing action after maintaining said corresponding position for the predetermined time; said adhesive material supply member (4, 17) and said adhesion enhancing means (C, C1) being controlled to perform said movement to said corresponding position from a downstream position to an upstream position.

7. A veneer joining apparatus according to claim 6, wherein said carrying-in conveyor and said carrying-out means are comprised of:

an anvil roll (19) adapted to feed veneers in a direction perpendicular to joining edges thereof;

upstream conveyor means (21) provided upstream of said anvil roll (19) to supply veneers to said anvil roll;

intermittent conveyor members (31, 31a) holding veneers tightly from above and below to carry the veneers intermittently and adapted to rotate between a raised position and lowered position about a rotation axis located at a position spaced by a predetermined distance on the downstream side of an upstream edge of the veneer, said intermittent conveyor members having a distance measuring device (32) to detect a veneer feed distance;

a cutting blade (22) provided reciprocally movable toward and away from said anvil roll (19);

an open-and-close classifier (27) provided downstream of said anvil roll (19) in parallel to an upstream end of said intermittent conveyor (31, 31a) and adapted to rotate about a rotation axis at a distance from a tip thereof pointing to an upstream direction to take a raised position to close communication with said anvil roll and a lower position to open communication with said anvil roll and also adapted to sustain both positions;

a veneer detection device (25, 26, 26a) provided upstream of said anvil roll to detect a border line between the utilizable portion and unnecessary portion of the veneer carried on the upstream conveyor means;

said adhesive material supply member (17) and said adhesion enhancing member (C, C1) being adapted to integrally run and halt in the limited area in a feed path constituted by said intermittent conveyor member (31, 31a);

said upstream conveyor means (21) and said anvil roll being run, said intermittent conveyor members (31, 31a) being halted, said intermittent conveyor members and said open-and-close classifier (27) integrally taking the raised position at upstream end thereof;

said veneer detection device (25, 26, 26a) detecting said border line at the downstream end portion of said veneer carried on the upstream conveyor means (21);

said running of the upstream conveyor means (21) and the anvil roll (19) being halted upon said detection of said border line, said cutting blade (22) being reciprocally moved;

said intermittent conveyor members (31, 31a) and said open-and-close classifier (27) being integrally rotated at upstream ends thereof to take the lowered position;

said upstream conveyor means (21), said anvil roll (19) and said intermittent conveyor members (31, 31a) being started to run;

said veneer detection device (25, 26, 26a) detecting a border line in said veneer at an upstream end thereof;

said upstream conveyor means, said anvil roll and said intermittent conveyor members being adapted to be halted in response to said detection of the border line;

said cutting blade being reciprocated before said intermittent conveyor members and said open-and-close classifier being rotated to take a raised position at upstream ends thereof to standby;

said upstream conveyor means and said anvil roll being run;

said intermittent conveyor members being adapted to hold veneers having unnecessary parts cut off with the joining edges of adjoining veneers maintained in a close abutment with each other by controlling such that sequentially succeeding veneers fed by said upstream conveyor means have downstream and upstream border lines thereof detected by said veneer detection device;

said edges of the respective veneers in close abutment being detected upon sequentially reaching said limited area by a signal from said distance measuring instrument (32) detecting said adhesive material supply member and said adhesion enhancing means being fed to, in case said intermittent conveyor member is in motion, to a position corresponding to said edges of the veneers to supply adhesive materials and perform said adhesion enhancing action in synchronization with said intermittent conveyor members being run and halted, and in case said intermittent conveyor member is being halted, to said position corresponding to said edges of the veneers to supply adhesive materials and perform said adhesion enhancing action in synchronization with said intermittent conveyor members being halted and run for a predetermined period; and said adhesive material supply members and said adhesion enhancing members being moved to said corresponding positions to apply adhesive materials and perform adhesion enhancing actions on an adhesive material at the most downstream position for sequentially fed veneers within said limited area.

* * * * *